(12) United States Patent
Ezzadeen et al.

(10) Patent No.: US 12,525,289 B2
(45) Date of Patent: Jan. 13, 2026

(54) ELECTRONIC CIRCUIT WITH RRAM CELLS

(71) Applicants: Commissariat à l'énergie atomique et aux énergies alternatives, Paris (FR); Centre national de la recherche scientifique, Paris (FR); Université d'Aix-Marseille, Marseilles (FR)

(72) Inventors: Mona Ezzadeen, Grenoble (FR); Bastien Giraud, Grenoble (FR); Jean-Philippe Noel, Grenoble (FR); Jean-Michel Portal, Saint Savournin (FR)

(73) Assignees: Commissariat à l'énergie atomique et aux énergies alternatives, Paris (FR); Centre national de la recherche scientifique, Paris (FR); Université d'Aix-Marseille, Marseilles (FR)

( * ) Notice: Subject to any disclaimer, the term of this patent is extended or adjusted under 35 U.S.C. 154(b) by 176 days.

(21) Appl. No.: 18/483,638

(22) Filed: Oct. 10, 2023

(65) Prior Publication Data
US 2024/0135991 A1 Apr. 25, 2024

(30) Foreign Application Priority Data
Oct. 14, 2022 (FR) ...................................... 22 10591

(51) Int. Cl.
*G11C 11/00* (2006.01)
*G11C 11/54* (2006.01)
*G11C 13/00* (2006.01)
(52) U.S. Cl.
CPC ............ *G11C 13/004* (2013.01); *G11C 11/54* (2013.01); *G11C 13/0026* (2013.01); *G11C 13/0038* (2013.01)

(58) Field of Classification Search
CPC ... G11C 13/004; G11C 11/54; G11C 13/0026; G11C 13/0038; G11C 13/0061;
(Continued)

(56) References Cited

U.S. PATENT DOCUMENTS 9,812,199 B2 * 11/2017 Kim ................... G11C 13/0069
11,250,898 B2 * 2/2022 Sanjeevarao ...... G11C 13/0023
(Continued)

OTHER PUBLICATIONS

French Preliminary Search Report issued Apr. 13, 2023 in French Application 22 10591 filed on Oct. 14, 2022, 4 pages (with English Translation of Categories of Cited Documents).
(Continued)

*Primary Examiner* — Tha-O H Bui
(74) *Attorney, Agent, or Firm* — Oblon, McClelland, Maier & Neustadt, L.L.P.

(57) ABSTRACT

An electronic circuit is provided that performs binary computation operations and includes word, bit and source lines, and memory cells organized in rows and columns. Each cell includes one pair of memristors and one pair of switches, each memristor being connected to a switch and linked to the same source line during each computation operation, each pair of memristors storing a binary value; the switches being linked to a word line and to a pair of complementary bit lines. The circuit includes a reading module that includes a logic unit for each column, each including an input terminal connected to a source line to receive a column value, the logic unit toggling between values, depending on a comparison of the column value with a toggle threshold value; and a modification unit for modifying a difference between the column and threshold values.

23 Claims, 12 Drawing Sheets

(58) Field of Classification Search
CPC ........ G11C 2013/0042; G11C 2213/79; G06F 7/5443; G06F 2207/4814; G06F 15/7821; G06N 3/0464; G06N 3/0495; G06N 3/063
USPC ......................................................... 365/148
See application file for complete search history.

(56) References Cited

U.S. PATENT DOCUMENTS

| | | | |
|---|---|---|---|
| 11,361,215 B2* | 6/2022 | Song | G06N 3/063 |
| 2019/0043575 A1 | 2/2019 | Lim et al. | |

OTHER PUBLICATIONS

Wang et al., "Efficient and Robust Nonvolatile Computing-In-Memory Based on Voltage Division in 2T2R RRAM With Input-Dependent Sensing Control" IEEE Transactions on Circuits and Systems—II: Express Briefs, vol. 68, No. 5, 2021, pp. 1640-1644.

Ezzadeen et al., "Low-Overhead Implementation of Binarized Neural Networks Employing Robust 2T2R Resistive RAM Bridges" IEEE 51st European Solid-State Device Research Conference, 2021, pp. 83-86.

Chen et al., "Reconfigurable 2T2R ReRAM Architecture for Versatile Date Storage and Computing In-Memory" IEEE Transactions on Very Large Scale Integration (VLSI) Systems, vol. 28, No. 12, 2020, pp. 2636-2649.

\* cited by examiner

ELECTRONIC CIRCUIT WITH RRAM CELLS

CROSS-REFERENCE TO RELATED APPLICATIONS

This application is a U.S. non-provisional application claiming the benefit of French Application No. 22 10591, filed on Oct. 14, 2022, which is incorporated herein by reference in its entirety.

FIELD

The present invention relates to an electronic circuit suitable for implementing computation operations each providing a binary output.

The invention relates to any type of application using operations applied to binary operands, in particular applications using binary artificial neural networks, also called BNN (Binary Neural Network).

BACKGROUND

In particular, a neural network generally consists of a succession of neuron layers, each of which takes the inputs thereof from the outputs of the preceding layer. More precisely, each layer comprises neurons taking the inputs thereof from the outputs of the neurons of the preceding layer. Each layer is linked to the next by a plurality of synapses. A synaptic weight is associated with each synapse. The synaptic weight is a number, such as a binary number, or further a distribution which takes both positive and negative values. In the case of a dense layer, the input of a neuron is the weighted sum of the outputs of the neurons of the preceding layer, the weighting being made by the synaptic weights and followed by an activation via an activation function.

Therefore, it is desirable to develop dedicated hardware architectures, intermingling memory and computation, for producing fast neural networks, with low power consumption and apt to learn in real time.

Such dedicated hardware architectures are more generally aimed at efficiently performing operations applied to binary operands.

A neural network based on optical technologies is known.

Another field of research relates to the production of neurons and synapses of neural networks on the basis of CMOS (Complementary Metal-Oxide-Semiconductor) technology. The abbreviation CMOS refers both to a manufacturing method and to a component produced by such a manufacturing method.

However, according to each of the technologies, each neuron occupies several tens of micrometers in size. Furthermore, each synapse also occupies several tens of micrometers in size. As a result, over a limited surface area corresponding, e.g., to an electronic chip, the number of neurons and synapses which can be integrated is limited, which results in a decreased performance of the neural network.

For this reason, to reduce congestion, architectures in which synapses are memristive are specifically studied.

Memristive synapses are synapses using memristors. In electronics, the memristor is a passive electronic component. The name is a portmanteau word formed from the two English words memory and resistor. A memristor is a non-volatile memory component, the value of the electrical resistance thereof changing with the application of a voltage for a certain period of time and, in the absence of voltage, staying at said value.

Examples of such an implementation are provided in the following articles:

"*A fully Integrated Analog ReRAM based 78.4TOPS/W Compute-in-Memory Chip with fully Parallel MAC Computing*" by Q. Liu et al. (2020);

"*A 1 Mb Multibit ReRAM Computing-in-Memory Macro with 14.6 ns Parallel MAC Computing time for CNN based AI Edge Processors*" by C. Xue et al. (2019);

"*A 22 nm 4 Mb 8b-Precision ReRAM Computing-in-Memory Macro with 11.91 to 195.7TOPS/W for tiny AI Edge devices*" by C. Xue et al. (2021);

"*A 16 Mb dual-mode ReRAM macro with sub-14 ns computing-in-memory and memory functions enabled by self-write termination scheme*" by W. Chen et al. (2017); and "*Embedded 1-Mb ReRAM-based Computing-in-Memory Macro with Multibit Input and Weight for CNN-based AI Edge Processors*" by C. Xue et al. (2019).

According to the above articles, the approach consists in storing the weights of a neuron within a column of RRAM or ReRAM (Resistive Random-Access Memory) memory cells, and in applying the inputs (activations) to the word lines, generally denoted by WL, of said column (a positive voltage being applied to an associated bit line), generally denoted by BL. The input voltages can be binary (open or closed access transistors) or can take several possible values in the case of multi-bit inputs. A weight equal to 1 is generally coded by a low resistance state, denoted by LRS, and a weight equal to 0 by a high resistance state, denoted by HRS. If the input corresponding to a given weight is equal to 1, a current will result—by Ohm's law—within the cell carrying the multiplication between the input and the weight. If the weight is equal to 1, the current is high (because the resistance is low), and if the weight is equal to 0, the current is low.

Since the cells are connected via source lines, usually denoted by SL, the currents are added via Kirchhoff's law, resulting in a MAC (Multiply And Accumulate) operation well known for neural network inference. A comparator circuit computes the effective output of the neuron by comparing the result of the MAC operation with a reference value.

However, such neuromorphic circuits suffer today from the too great variability of resistive memory cells, due to the low maturity of the manufacturing thereof. Therefore, such approaches are limited in terms of the number of operands of a MAC operation, typically to 9 inputs. Moreover, again because of the high variability of the memory cells, such approaches require a complex circuitry for comparing the MAC operation with the different possible threshold values, resulting in a large surface area and high consumption.

Another approach is presented in the paper "*Efficient and Robust Nonvolatile Computing-In-Memory Based on Voltage Division in 2T2R RRAM With Input-Dependent Sensing Control*" by L. Wang et al. (2021). The approach consists in carrying out the accumulation via a resistive bridge and not an accumulation of current. Such approach uses columns of RRAM cells resulting from the merging of the source line SL of two columns (2T2R structure for 2 transistors and 2 resistors, a pair of switches and a pair of memristors). Each column thereby has a pair of complementary bit lines BL, BLb and a source line SL. Two resistors are used for the differential coding (HRS-LRS or LRS-HRS) of each weight. A voltage is then applied between the complementary bit lines BL, BLb of the column, thereby establishing a resistive bridge between the resistors on the left and right sides of the column. The resulting voltage corresponds to the result of the MAC operation. Although leading to greater robustness with regard to the variability of neurons, such approach has the same drawbacks as the previous approach in terms of complexity and surface area of the comparators required at the bottom of the column and appears to be still limited to 9 inputs.

Finally, a final approach is presented in the article "*Low-Overhead Implementation of Binarized Neural Networks Employing Robust 2T2R Resistive RAM Bridges*" by M. Ezzadeen et al. (2021). The approach consists in applying the differential inputs to the complementary bit lines BL, BLb (and no longer to the word lines WL), by activating a respective word line of the matrix of memory cells. The weights are differentially coded in 2T2R cells. A resistive bridge structure within each 2T2R cell results therefrom, resulting in an exclusive OR operation, or XOR, at the output of each source line SL. Since the binary multiplication operation is equivalent to an exclusive NOR operation, or XNOR, a single inverter at the end of the source line SL is used for producing the result of the XNOR operation. The accumulation is performed by a capacitive bridge, connecting each inverter output to a capacitor, and connecting all the capacitors together to form the bridge. Such approach has the advantage of being extremely robust with regard to cell variability (due to the use of capacitors, mature technology) despite a low surface area impact (single inverter per column). The approach, due to the robustness thereof, is further used for implementing very large neurons (up to 513 inputs), by performing in one go (the same computation cycle) the summation of contributions from a large number of inputs, as all columns are activated at the same time so as to compute for a neuron associated with a row of the matrix. Furthermore, the memory cells coding the weights are in practice more compact, because it is sufficient to have a single 2T-2R cell and a single word line per row. However, only one neuron can perform a computation during a given cycle, because only one row of the memory cell array is activated at each computation. Depending on the application context, the solution "one neuron per row" or "one neuron per column" will be preferred, in particular depending on the number of inputs of each neuron, depending on the number of neurons per layer, the available surface area, etc.

SUMMARY

There is thus a need for an electronic circuit making it possible in particular to produce a binary neural network which is less bulky and has better integrability into a set of memory cells.

To this end, the subject matter of the invention is an electronic circuit suitable for implementing computation operations each providing a binary output, the circuit comprising:
  word lines;
  pairs of complementary bit lines;
  source lines;
  a set of memory cells organized into a matrix comprising rows and columns, the memory cells of the same row being selectable by at least one word line, the memory cells of the same column being linked to a pair of complementary bit lines and at least one source line;
  each memory cell having at least one pair of memristors and at least one pair of switches, each memristor of a respective memory cell being connected to a respective switch and linked to the same source line during each computation operation, each pair of memristors correspondingly storing a binary value presenting, correspondingly, first and second different resistance values; the switches being linked, for activation, to a respective word line and correspondingly linked to a pair of complementary bit lines, the two switches of a respective pair being linked to the same word line;
  a reading module implemented during each computation operation, the reading module including:
    one logic unit for each column, each logic unit comprising at least one input terminal connected to a respective source line, for receiving an input value called the column value, the logic unit being suitable for performing a logic operation which toggles between a low value and a high value depending on a comparison of the column value with a toggle threshold value, during the computation operation, and
    a modification unit suitable for modifying, for at least one logic unit and depending on the desired computation operation, a difference between the column value and the toggle threshold value.

With the electronic circuit according to the invention, the reading module, including a logic unit for each column and the modification unit apt to modify, for at least one logic unit and according to the computation operation, the difference between the column value and the threshold value, can be used for more efficiently determining a resulting value corresponding to the voltage of the respective source line.

Preferentially, each memory cell includes two pairs of memristors and two pairs of switches, with a first pair of switches linked to a first word line assigned to an input, and a second pair of switches, respectively, linked to a second word line assigned to the inverse of said input; and with a first pair of memristors associated with the first pair of switches and storing a synaptic weight, and a second pair of memristors, respectively associated with the second pair of switches and storing the inverse of the same synaptic weight.

According to such clever implementation, each memory cell is then used for directly performing an exclusive NOR operation, or XNOR, between an input and the corresponding synaptic weight of a respective neuron, and an inference value of said neuron then being obtained directly from the resulting value corresponding to the voltage of the respective source line, or from the resulting values corresponding to the voltages of the respective source lines when the synaptic weights of said neuron are coded on a plurality of columns of the set of memory cells in matrix form.

According to other advantageous aspects of the invention, the electronic circuit comprises one or a plurality of the following features, taken individually or according to all technically possible combinations:
  the modification unit is suitable for modifying the difference between the column value and the toggle value for a respective logic unit, by commanding a modification of the complementary voltages applied to the pair of complementary bit lines for the column associated with said logic unit;
  the modification unit is suitable for modifying the difference between the column value and the threshold value for a respective logic unit, by commanding a modification of the threshold value of said logic unit;
  said threshold value being preferentially modified by a change in the supply voltage of said logic unit and/or by a change in the bias voltage of a rear gate of at least one transistor of said logic unit;

the modification unit is suitable for modifying, incrementally according to a predefined incrementation step, said difference between the column value and the toggle threshold value, for determining—among a plurality of predefined possible values—a resulting value corresponding to the voltage of the respective source line corresponding to said column value; the incrementation step depending on said plurality of possible values;

the reading module further includes a storage unit for at least one column, each storage unit being suitable for storing the resulting value determined for the respective column, pending the determination of all the resulting values for a respective group of a plurality of columns;

each storage unit preferentially including a bit register for storing said determined resulting value in binary form;

the reading module further includes an extinction unit for each column, each extinction unit being suitable—after determining the resulting value for the respective column and pending determination of all the resulting values for a respective group—for commanding the application of the same voltage to the pair of complementary bit lines for the circulation of a substantially zero current in the source line of the respective column;

each memory cell has two pairs of memristors and two pairs of switches;

a first pair of switches is linked to a first word line assigned to an input, and a second pair of switches, respectively, is linked to a second word line assigned to the inverse of said input; and wherein a first pair of memristors is associated with the first pair of switches and stores a binary value, and a second pair of memristors, respectively, is associated with the second pair of switches and stores the inverse of the same binary value;

each memory cell includes only one pair of memristors and only one pair of switches, each pair of memristors correspondingly storing a synaptic weight;

the logic operation performed by the logic unit is an inversion, and the associated computation operation is chosen from: a neural computation operation, such as the MAC operation; an AND operation; an OR operation; a Majority operation;

the value of the toggle threshold depends on the associated computation operation;

when the associated computation operation is the AND operation or the OR operation, the value of the toggle threshold being preferentially at a voltage step of a voltage of a corresponding bit line, the corresponding voltage of the bit line being one of the voltages of the complementary bit lines for the AND operation and the other of said voltages being for the OR operation, the voltage step satisfying the following equation:

$$P = \frac{\Delta BL}{OPD + 1}$$

where P represents the voltage step;

ΔBL represents the voltage differential between the voltage of the bit line and the voltage of the complementary bit line, and OPD represents the number of operands to which the computation operation is applied;

when the associated computation operation is the Majority operation, the value of the toggle threshold being preferentially a median value of voltages of the complementary bit lines;

the reading module further includes a combination unit for at least one column, each combination unit being suitable for combining the results of logic operations carried out successively by a respective logic unit, for implementing a combined logic operation;

each combination unit preferentially including a flip-flop connected to the output of the respective logic unit;

the combined logic operation being preferentially further selected from the group consisting of: an exclusive OR operation and an exclusive NOR operation;

each memory cell of a respective column comprises at least one pair of sub-cells, each sub-cell including a memristor and a switch, each memristor of a respective sub-cell being connected to a respective source line and switch, the memristors of each pair of sub-cells correspondingly storing a binary value by correspondingly presenting first and second different resistance values; the switches being linked, for the activation thereof, to a respective word line and correspondingly linked to a pair of complementary bit lines, the two switches of a respective pair of sub-cells being linked to the same word line; the two source lines associated with a respective pair of sub-cells being connected to each other via an auxiliary switch during each computation operation and then forming the same source line to which each memristor of a respective memory cell is connected during each computation operation;

the electronic circuit is a neuromorphic circuit suitable for implementing a neural network with binary output, each memory cell being associated with a respective synaptic weight of a neuron, and the word lines being apt to receive input voltages during a neural computation operation;

the electronic circuit comprises a first controller for selecting the memory cells of a row which are connected to the same word line, and comprising a second controller linked to the bit line pairs and used for applying voltages to each bit line pair different and symmetrical with respect to a middle voltage, the voltage applied to a bit line being either higher or lower than the voltage applied to the associated complementary bit line;

the electronic circuit includes a plurality of distinct sets of memory cells suitable for operating in parallel.—each logic unit performing an inverter type logic function;

each logic unit being preferentially a single inverter;

the single inverter preferentially further including only two transistors.

BRIEF DESCRIPTION OF THE DRAWINGS

Such features and advantages of the invention will become clearer upon reading the following description, given only as a non-limiting example, and made with reference to the enclosed drawings, wherein.

DETAILED DESCRIPTION

It should be noted that the expression "suitable for" followed by a verb is considered equivalent to the expression "configured for" followed by the same verb. If need be, the expression "suitable for" will then be replaced by the expression "configured for", without modifying the content and the substance of the present invention.

Figure 1:
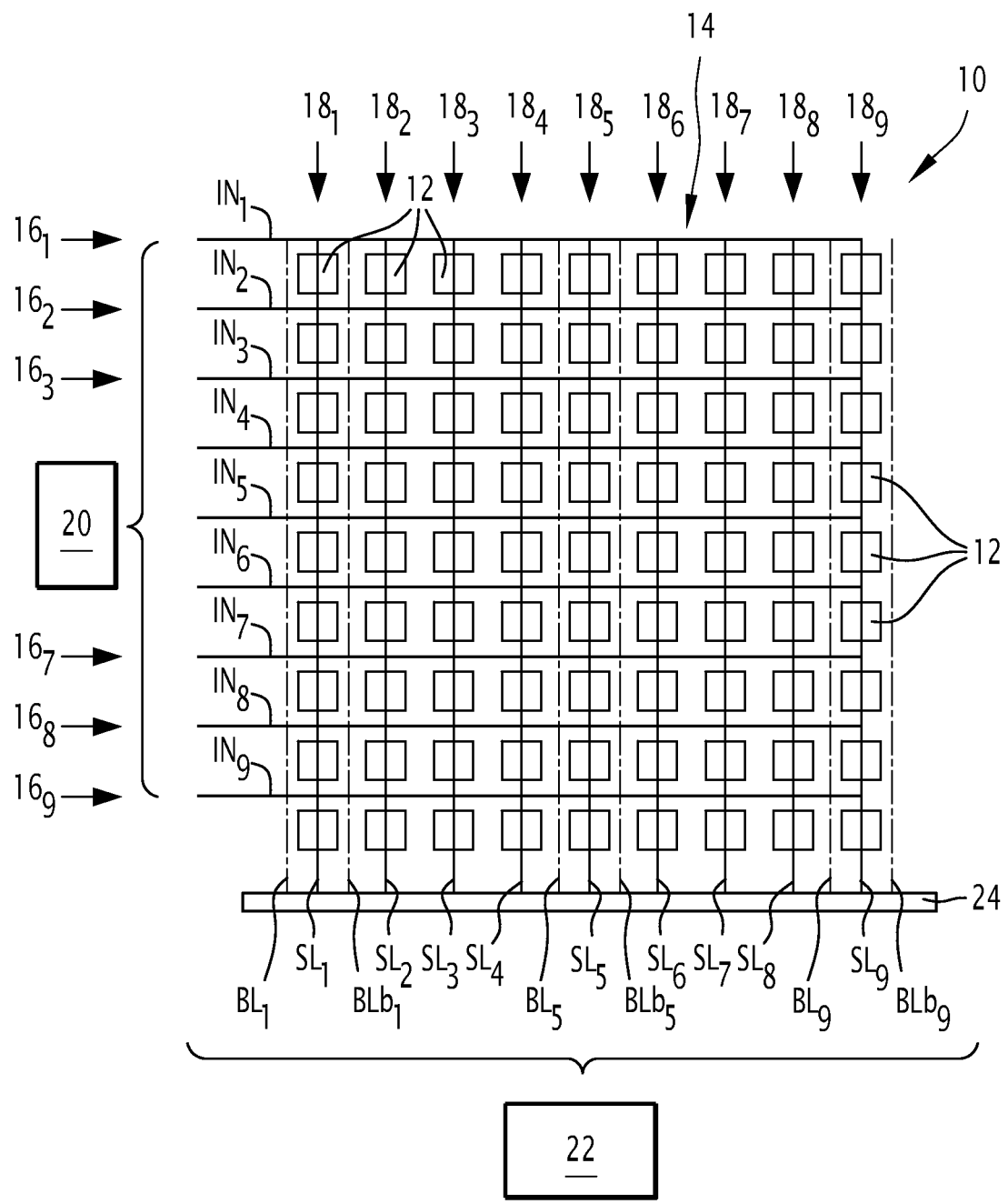
FIG. 1 is a schematic representation of an electronic circuit, according to the invention, suitable for implementing computation operations each providing a binary output, the circuit comprising word lines, pairs of complementary bit lines, source lines, a set of memory cells organized according to a matrix having rows and columns, each memory cell including at least one pair of memristors and at least one pair of switches, and a reading module implemented during each computation operation, the reading module including a logic unit for each column, each logic unit performing a logic operation with a toggle between a low value and a high value based on a comparison of a column value against a toggle threshold value, and a modification unit, for at least one logic unit and depending on the computation operation, a difference between the column value and the toggle threshold value.

In FIG. 1, an electronic circuit 10 is suitable for implementing computation operations each providing a binary output. The computation operations performed by the electronic circuit 10 are e.g. neuronal computation operations, such as operations of counting the number of 1s in a series of bits (popcount), or even MAC (multiply and accumulate) operations well known for neural network inference; AND operations on binary operands; OR operations on binary operands; Majority operations among binary operands.

The electronic circuit 10 comprises a set of memory cells 12, i.e. a plurality of memory cells 12, the memory cells 12 being organized according to a two-dimensional matrix 14 including rows 16 and columns 18.

Figure 7:
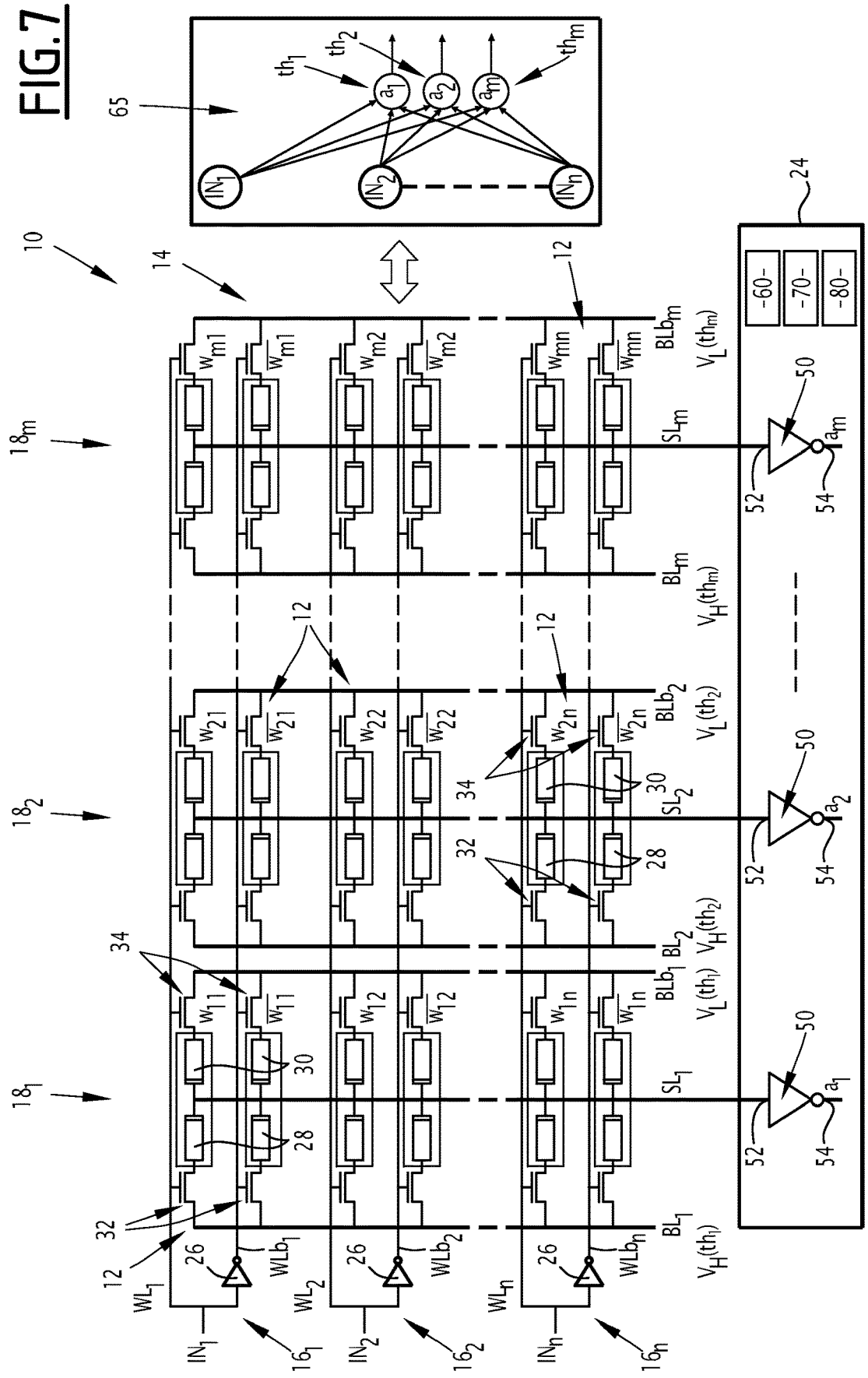
FIG. 7 is a representation of the electronic circuit according to the invention with the memory cells shown in FIG. 2, in an example where the electronic circuit forms a neuromorphic circuit implementing a binary output neural network, each memory cell being associated with a respective synaptic weight of a neuron, and the word lines being apt to receive input voltages during a neuron computation operation.

In addition, the electronic circuit 10 includes a plurality of distinct sets of memory cells 12 suitable for operating in parallel, as illustrated in particular in the example shown in FIG. 7.

In the continuation of the description, the matrix 14 will be referred to by the term matrix of cells 14. A memory cell 12 has the coordinates (i,j) when said memory cell 12 is positioned at the intersection of the i-th row 16, and the j-th column 18, with i and j being two integers.

In the example shown in FIG. 1, the number of rows 16 and columns 18 is equal to N, so that the indices i and j are comprised between 1 and N. The example in FIG. 1 shows a matrix of cells 14 for which N is equal to 9. In a variant, the number of rows 16 and columns 18 can of course be different.

More generally, in the example shown in FIG. 7, the number of rows 16 is equal to n and the number of columns 18 is equal to m, respectively, so that the index i is between 1 and n, and the index j is between 1 and m, respectively.

The electronic circuit 10 further comprises word lines WL (visible in FIGS. 2, 7 and 10), pairs of complementary bit lines BL and BLb, source lines SL and two controllers 20 and 22.

The electronic circuit 10 further comprises a reading module 24 implemented during each computation operation, which will be described in greater detail hereinafter in the description.

In the preceding notations, a word line is referenced by WL; the complementary bit lines BL and BLb use the acronym BL and the source lines are referenced by SL.

In the example shown in FIG. 1, each memory cell 12 is connected to a respective input line IN, a respective source line SL and a respective pair of complementary bit lines BL and BLb.

Each input line IN is suitable for receiving or for selecting an operand to which the computation operation is to be applied. Each input line IN is e.g. suitable for receiving an input value for the computation operation.

Each input line IN is as such connected to a respective word line WL or to a respective pair of complementary word lines WL and WLb, depending on the topology of the memory cells 12. In the examples shown FIGS. 2, 4 and 7, each input line IN is connected to a respective pair of complementary word lines WL and WLb. In the example shown in FIG. 10, each input line IN is connected to only one respective word line WL.

Each memory cell 12 of the same row 16 shares the same input line IN, as such connected to a respective word line WL or to a respective pair of complementary word lines WL and WLb, so that the input lines IN, and the word lines WL, WLb, respectively, can also be indexed with the index i.

Thereby, the first input line IN, i.e. the line which links the memory cells 12 of the first row 16, is referenced by $IN_1$; and the word line(s) associated with the first input line $IN_1$ are referenced by $WL_1$, or $WL_1$ and $WLb_1$, respectively.

The memory cells 12 of the same column 18 share the same pair of complementary bit lines BL and BLb and the same source line SL. The three lines can thus also be indexed with the index j.

For clarity, all the source lines SL are shown, but only the pairs of complementary bit lines BL and BLb of the first column $18_1$, of the fifth column $18_5$ and of the ninth column $18_9$ are shown in dot-dash lines in FIG. 1.

The memory cells 12 of the same row 16 are then selectable by at least one word line WL, and the memory cells 12 of the same column 18 are linked to a pair of complementary bit lines BL, BLb and a source line SL.

The first controller 20 can be used for selecting the memory cells 12 of a row 16, which are linked to the same word line WL.

The first controller 20 is suitable for controlling each input line IN, and, by transitivity, each word line WL, WLb. Indeed, when each input line IN is connected to a respective pair of complementary word lines WL and WLb, the input line IN is connected directly to one WL of the word lines, and, via an inverter 26, hereinafter called a word line inverter 26, to the other WLb of the word lines; and the control of the value applied to the input line IN leads also to the control of the value applied to the respective pair of complementary word lines WL and WLb. Indeed, a person skilled in the art would of course understand that the value applied to the input line IN is then the same as the value applied to the word line WL which is connected directly to the input line IN, and, as a result, the value applied to the input line IN is then the inverse of the value applied to the complementary word line WLb which is connected to the input line IN via the word line inverter 26. Of course, when each input line IN is connected directly to only one respective word line WL, as in the example shown in FIG. 10, then the value applied to the input line IN is the same as the value applied to said word line WL connected directly to the input line IN.

The term "inverse" of a binary value refers to the value complementary to 1 of said binary value. In other words, if a binary value is equal to 0, the inverse of said binary value is equal to 1; and if a binary value is equal to 1, the inverse of that binary value is equal to 0.

The second controller 22 is suitable for controlling the pairs of complementary bit lines BL and BLb and the source lines SL.

The second controller 22 is connected to the pairs of bit lines BL, BLb and is used for applying different voltages to each pair of bit lines BL, BLb, the voltages applied during the computation operation being advantageously symmetrical with respect to a middle voltage, the voltage applied to a bit line BL being either higher or lower than the voltage applied to the associated complementary bit line BLb.

The first controller 20 and the second controller 22 are configured for being driven in a coordinated manner, for commanding the memory cells 12 with the lines same control according to the desired operation.

More particularly, the first controller 20 is configured for bringing the values of the inputs circulating on each of the input lines IN. It is such input values which will e.g. supply the neural network produced, where appropriate, by the electronic circuit 10.

The inverter 26 is an element suitable for receiving an incident signal on an input 26E and for performing a logic inversion computation so as to transmit on an output 26S, an output signal which is the inverse of the incident signal. Herein, the input 26E of the inverter 26 is connected to the input line IN, and the output 26S of the inverter 26 is connected to the complementary word line WLb.

Each memory cell 12 is suitable for storing at least one binary value, such as a binary weight, in particular a respective binary synaptic weight of the neural network when the computation operation performed is a neural computation operation.

Figure 2:
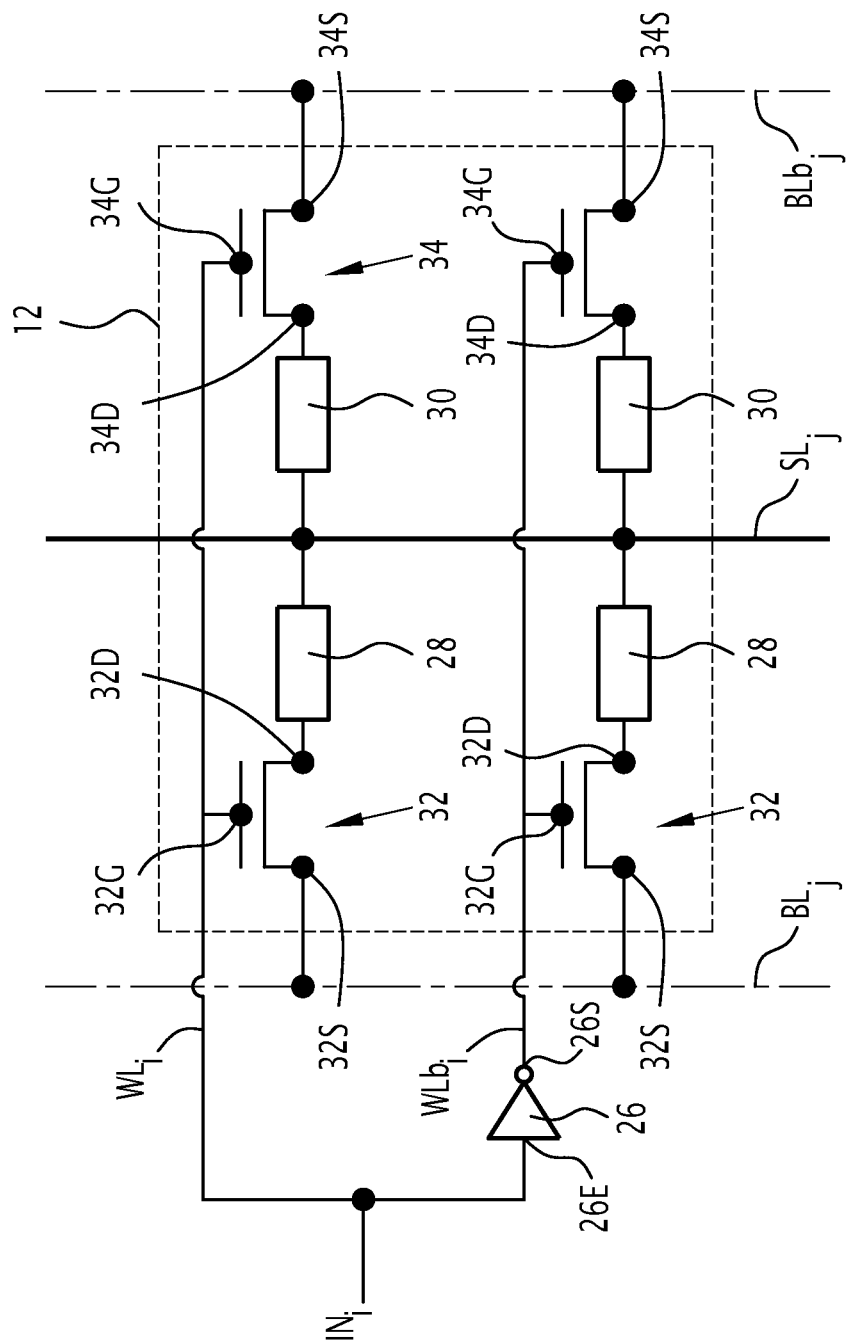
FIG. 2 is a schematic representation of a respective memory cell according to a first embodiment, where the memory cell includes two pairs of memristors and two pairs of switches.

The structure of a memory cell 12 is shown more precisely in FIG. 2 for the case of the memory cell 12 having the coordinates (i,j).

Each memory cell 12 includes at least one pair of memristors 28, 30, the or each pair of memristors being formed by two memristors, namely a first memristor 28 and a second memristor 30, and at least one pair of switches 32, 34, the or each pair of switches being formed by two switches, namely a first switch 32 and a second switch 34.

Figure 4:
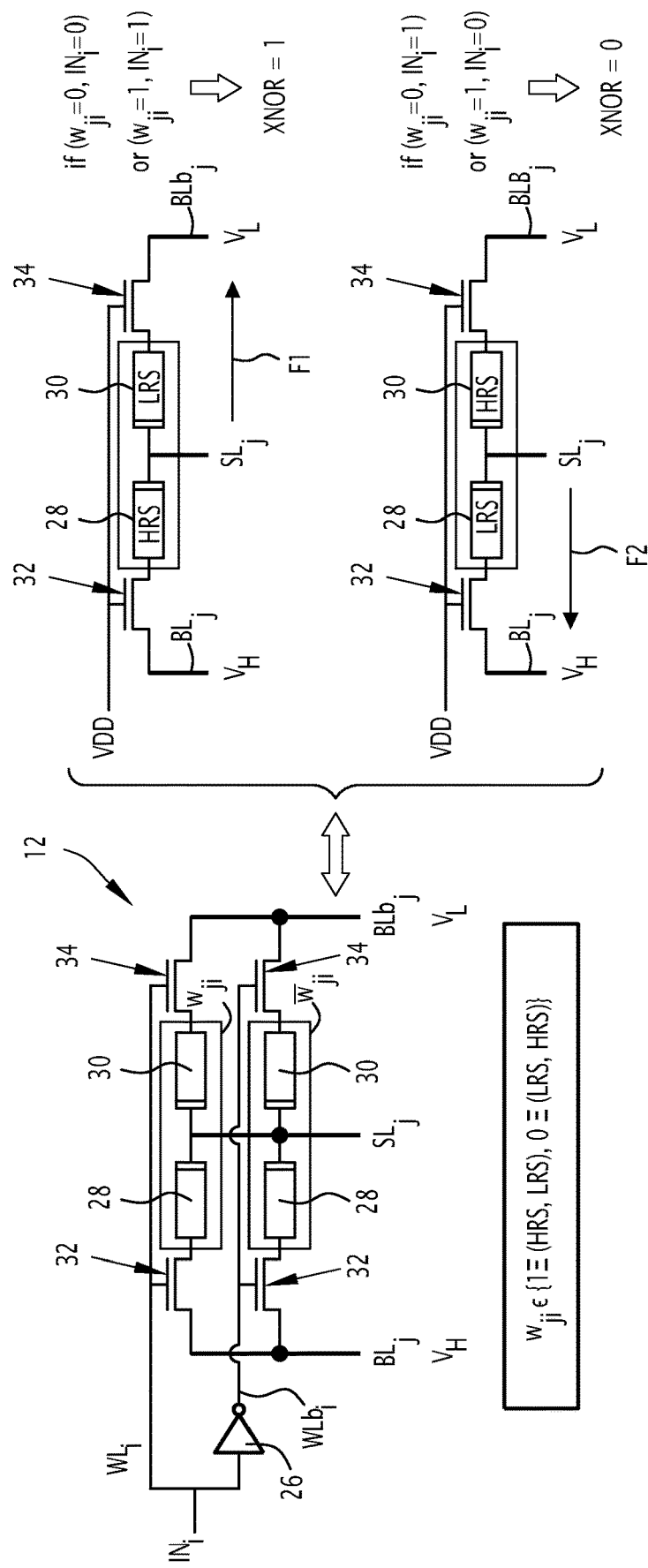
FIG. 4 is a schematic view illustrating an XNOR operation performed via the memory cell shown in FIG. 2.

In the examples shown in FIGS. 2, 4 and 7, each memory cell 12 includes two pairs of memristors 28, 30, i.e. two first memristors 28 and two second memristors 30, and two pairs of switches 32, 34, i.e. two first switches 32 and two second switches 34.

Figure 10:
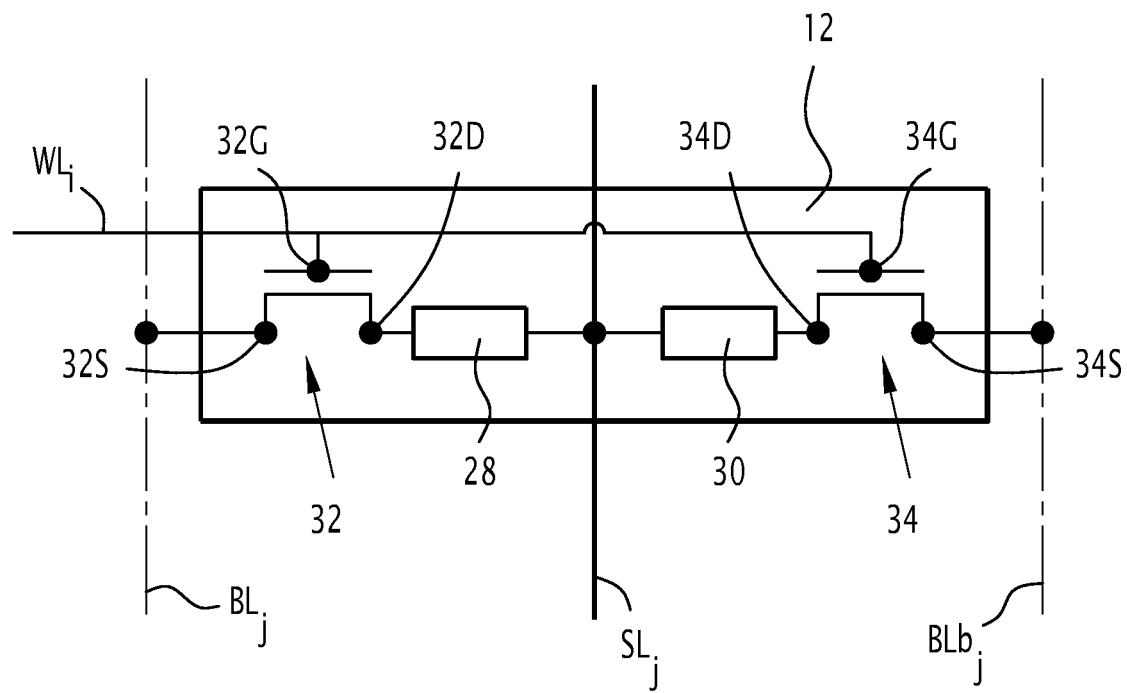
FIG. 10 is a schematic representation of a respective memory cell according to a second embodiment, where the memory cell includes only one pair of memristors and only one pair of switches.

In the example shown in FIG. 10, each memory cell 12 includes only one pair of memristors 28, 30, i.e. only a first memristor 28 and only one second memristor 30, and only one pair of switches 32, 34, i.e. only one first switch 32 and only one second switch 34.

Because memristors 28 and 30 are present, such a memory cell 12 is a resistive random-access memory cell. The memory cell 12 is more often referred to by the acronym RRAM or ReRAM.

Furthermore, such an arrangement is generally called a 4T4R structure with reference to the presence of the four switches (called 4T) and four memristors (called 4R) in the examples shown in FIGS. 2, 4 and 7. By analogy, such an arrangement is generally called a 2T2R structure with reference to the presence of two switches (called 2T) and two memristors (called 2R) in the example shown in FIG. 10. The memory cell 12 is also sometimes called a 4T4R cell in the examples shown in FIGS. 2, 4 and 7, or a 2T2R cell, respectively, in the example shown in FIG. 10.

Each memristor 28, 30 of a respective memory cell 12 is linked to the same source line SL and to a respective switch 32, 34, and each pair of memristors 28, 30 is configured for correspondingly storing a binary value correspondingly having first and second different resistance values. A person skilled in the art would observe that the source line SL to which the memristors 28, 30 of the respective memory cell 12 are linked is likely to consist of two distinct source lines connected together during the computation operation.

Each memristor 28, 30 is a component the electrical resistance value of which changes permanently when a current is applied. Thereby, a datum can be recorded and rewritten by a control current. Such behavior is observed in particular in phase-change materials, ferroelectric tunnel junctions or oxide-based redox memories, such as $HfO_x$ or $TiO_{2-x}$. The change in resistance of a memristor depends on the amplitude and on the duration of the voltage pulses applied through the memristor, as well as on the maximum value of current which can flow through the memristor e.g. for a "SET" operation, i.e. the change from a strong resistance to a weak resistance.

Thereby, each memristor 28, 30 has two states, namely a high state and a low state. The high state corresponds to a high resistance and is generally denoted by the abbreviation HRS. For this reason, hereinafter, the high state is referred to as HRS. The low state corresponds to a low resistance and is generally denoted by the abbreviation LRS. For this reason, hereinafter, the low state is referred to as LRS.

However, because of the variability in operation of the memristors 28, 30, it turns out that the resistance in the high resistance state HRS can be lower than the resistance in the low resistance state LRS, which generates errors if the information (weight) is coded in only one memristor 28, 30.

Figure 3:
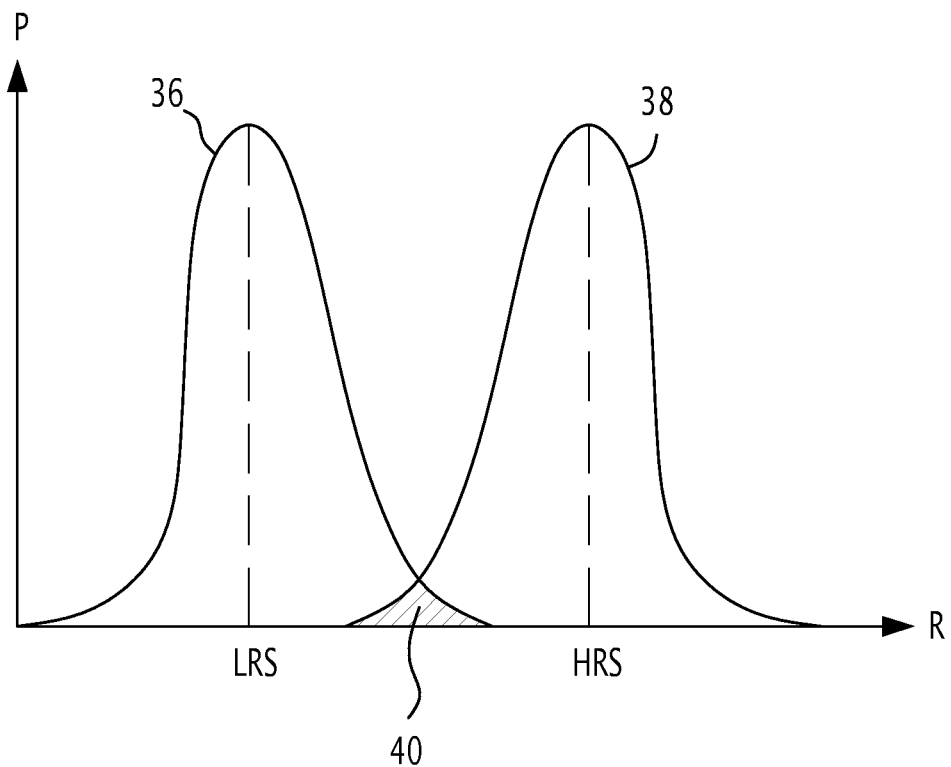
FIG. 3 is a graph showing the effect of the variability of the resistance values of the states of a memristor.

Such variability is shown schematically in FIG. 3. In said figure, the probability that a memristor 28, 30 presents in practice the resistance value depending on the state of the memristor, is proposed. More precisely, the first curve, the curve denoted by 36, schematically represents the probability for all the values observed in practice for the low resistance state LRS while the second curve 38 represents the same curve for the high resistance state HRS.

The graph in FIG. 3 shows that there is an overlap zone 40. In the overlap zone 40, it may be impossible to distinguish the low LRS and high HRS states. Such overlap could be more significant with the long-term temporal drifts of the memristors 28, 30.

To remedy such a problem, the information is coded by the ratio between the two resistances of the two states by means of a differential configuration of the two memristors 28 and 30. Also, the memristors 28 and 30 are serial and complementary memristors following the same logic coding. Complementarily, it is understood herein that memristors 28 and 30 have a different state, a low resistance state LRS for one memristor and a high resistance state HRS for the other memristor.

According to the examples shown in FIGS. 2, 4, 7 and 10, a high weight, i.e. a logic "1", is represented by a high resistance state HRS of the first memristor 28, and by a low resistance state LRS of the second memristor 30. As a corollary, a low weight, i.e. a logic "0", is represented by a low resistance state LRS of the first memristor 28, and a high resistance state HRS, respectively, of the second memristor 30.

Furthermore, in the examples shown in FIGS. 2, 4 and 7 where each memory cell 12 includes two pairs of memristors 28, 30, the pairs of memristors 28, 30 are preferentially coded in a complementary way from one pair to the other. In other words, within each memory cell 12, a pair of memristors 28, 30 is preferentially configured for coding a binary value, while the other pair of memristors 28, 30 is preferentially configured for coding the inverse of said binary value.

Also, in the above coding logic example, if the binary value to be coded is equal to 1 for the first pair of memristors 28, 30, the left-hand memristor, i.e. the first memristor 28, is coded in high resistance (high state HRS), and the right-hand memristor, i.e. the second memristor 30 is coded for low resistance (low state LRS), while for the second pair of memristors 28, 30 coding the inverse of said binary value, i.e. 0, the left-hand memristor, i.e. the first memristor 28, is coded for low resistance (low state LRS) and the right-hand memristor, i.e. the second memristor 30, is coded for high resistance (high state HRS).

A first pair of switches 32, 34 is connected to a first word line assigned to an input IN, namely the word line WL directly connected to the input line IN, and a second pair of switches 34, 32, respectively, is connected to a second word line assigned to the inverse of said input IN, namely the complementary word line WLb connected to the input line IN via the word line inverter 26. The first pair of memristors 28, 30 is associated with the first pair of switches 32, 34 and stores a binary value w; and the second pair of memristors 28, 30, respectively, is associated with the second pair of switches 34, 32 and stores the inverse of the same binary value w.

Furthermore, as described hereinabove, the first pair of memristors 28, 30 and the associated first pair of switches 32, 34 will have the word line WL thereof assigned to the input corresponding to the binary value, whereas the second pair of memristors 28, 30 and the second associated pair of switches 32, 34 will have the complementary word line WLb thereof assigned to the inverse of the same input, by means of the word line inverter 26.

The switches 32, 34 are linked, for the activation thereof, to a respective word line WL, WLb and linked to a pair of complementary bit lines BL, BLb, respectively, the two switches 32, 34 of a respective pair being linked to the same word line WL, WLb.

Each of the two switches 32 and 34 is e.g. a transistor, such as a field effect transistor, also called FET.

Thereby, each switch 32 and 34 has three electrodes, a gate G, a source S and a drain D. Generally, for a transistor the reference sign of which is X, where X refers to the reference 32 or 34, the electrodes will be denoted in the figures according to the following notation: the gate XG, the source XS and the drain XD.

Such notation is chosen herein for simplifying the representation, knowing that the positions of the source XS and of the drain XD are defined with respect to the main bias direction, i.e. the most used for the set-up. Of course, if the bias is reversed, a person skilled in the art knows that the roles and positions of the source XS and of the drain XD are exchanged.

According to the example described, the two switches 32 and 34 are insulated gate field effect transistors, also called MOSFET (Metal Oxide Semiconductor Field Effect Transistor).

Each gate 32G and 34G of the two switches 32 and 34 is connected to the word line WL. Depending on the voltage level present on the word line, the switches 32 and 34 become ON or, on the contrary, OFF, i.e. blocked. The first controller 20 will in practice choose to select one or a plurality of rows 16 of memory cells 12 by making conducting, the switches 32, 34 of the memory cells 12 of the row or rows 16.

Each first switch 32 is connected to a respective first memristor 28, and each second switch 34 is connected to a respective second memristor 30. The drain 32D of the first switch 32 is then linked to a terminal of the first memristor 28, the other terminal of the first memristor 28 being linked to the common source line SL. The drain 34D of the second switch 34 is linked to a terminal of the second memristor 30, the other terminal of the second memristor 30 being linked to the common source line SL. The source 32S of the first switch 32 is linked to the bit line BL whereas the source 34S of the second switch 34 is linked to the complementary bit line BLb.

The second controller 22 will drive the power supply of the pairs of bit lines, so that the voltage presented on a bit line $BL_j$ is different and complementary to the voltage presented on the complementary bit line $BL_j$. Thereby, when a memory cell 12 of coordinate i,j, in particular a pair of memristors 28, 30, is selected (the switches thereof becoming ON via the activation voltage presented on the associated word line $WL_i$ or $WLb_j$), the memristors 28 and 30 of said pair being in series and forming a resistive bridge between the bit lines $BL_i$ and $BLb_j$.

In the present case, the memristors 28 and 30 of said pair are thus supplied with voltages present on the bit lines $BL_j$ and $BLb_j$ which are symmetrical with respect to a voltage equal to [V(BL)+V(BLb)]/2, called the middle voltage, where V(BL) represents the voltage of the bit line BL, and V(BLb) represents the voltage of the complementary bit line BLb.

In the examples of FIGS. 2, 4 and 7, with the coding logic defined above, if the binary value, such as a weight, in particular a synaptic weight of a binary neural network, stored in a given memory cell 12 is equal to 0, then for the first pair of memristors 28, 30, the first memristor 28 (corresponding to the one at the top left among the four memristors of the memory cell 12) is in the low state LRS and the second memristor 30 (corresponding to the one at the top right) is in the high state HRS; and conversely, for the second pair of memristors 28, 30, the first memristor 28 (corresponding to the one at the bottom left) is in the high state HRS and the second memristor 30 (corresponding to the one at the bottom right) is in the low state LRS.

A person skilled in the art would of course understand that the coding is reversed if the binary value stored in the memory cell 12 is equal to 1, and for the first pair of memristors 28, 30, the first memristor 28 (corresponding to the one at the top left) is in the high state HRS and the second memristor 30 (corresponding to the one at the top right) is in the low state LRS; and conversely, for the second pair of memristors 28, 30, the first memristor 28 (corresponding to the memristor at the bottom left) is in the low state LRS and the second memristor 30 (corresponding to the memristor at the bottom right) is the high state HRS.

A person skilled in the art would also observe that in the examples shown in FIGS. 2, 4 and 7 and due to the word line inverter 26, only one pair of memristors 28, 30 among the two pairs of memristors 28, 30 can be activated at the same time. More particularly, in such examples, and given that the word line inverter 26 is connected to the complementary word line WLb associated with the second pair of memristors 28, 30, if the input value received on the input line IN is equal to 1, then the first pair of memristors 28, 30 is activated since the value on the word line WL directly connected to the input line IN is also equal to 1 and the switches 32, 34 associated with the first pair are therefore on, whereas the second pair of memristors 28, 30 is not activated since the value on the complementary word line WLb is then equal to 0, the word line inverter 26 inverting the input value equal to 1 into the value 0, and hence the switches 32, 34 associated with the second pair are OFF, i.e. blocked. Conversely, if the input value received on the input line IN is equal to 0, then the first pair of memristors 28, 30 is not activated since the value on the word line WL is also equal to 0 and the switches 32, 34 associated with the first pair are thus OFF, whereas the second pair of memristors 28, 30 is in this case activated since the value on the complementary word line WLb is then equal to 1, the word line inverter 26 inverting the input value equal to 0 into the value 1, and that the switches 32, 34 associated with the second pair are thus ON.

Furthermore, when a voltage is applied between the bit line BL and the complementary bit line BLb, with a higher potential $V_H$ for the bit line BL than the $V_L$ for the complementary bit line BLb, a resistive bridge between the first and second memristors 28, 30 of the pair of memristors 28, 30 becomes activated as a result therefrom, as explained hereinabove. The memristor 28, 30 which is in the high state HRS then systematically pushes the voltage of the midpoint, i.e. the voltage of the source line SL, towards the bit line BL, BLb which is connected to the memristor 28, 30 in the low state LRS.

Also, in the examples shown in FIGS. 2, 4 and 7, with such clever implementation of the two pairs of memristors 28, 30 coupled to the two complementary word lines WL, WLb, one of the word lines being connected to the input line IN via the word line inverter 26, each memory cell 12 then makes it possible to directly perform an exclusive NOR operation, or XNOR, between the binary input received on the input line IN and the binary value, such as the corresponding synaptic weight of a respective neuron, stored in the memory cell 12, and the result of the XNOR operation is then obtained by comparing the voltage of the source line SL with the middle voltage.

In the example shown in FIG. 4, with the coding logic defined hereinabove, if the voltage of the source line SL is lower than the middle voltage [V(BL)+V(BLb)]/2, then the result of the operation XNOR is equal to 1; if the voltage of the source line SL is higher than the middle voltage [V(BL)+V(BLb)]/2, then the result of the operation XNOR is equal to 0.

The four possible situations according to whether the binary input value, also called binary input, received on the input line $IN_i$ is equal to 0 or 1, and is according to whether the binary value $w_{ji}$ stored in the memory cell 12 is equal to 0 or 1, are then shown concisely on the right-hand part of FIG. 4.

In the first situation where the binary input received on the input line $IN_i$ is equal to 0 and the binary value $w_{ji}$ stored in the memory cell 12 is equal to 0, the second pair of memristors 28, 30 is activated, and the first memristor 28 (corresponding to the memristor on the left) is in the high state HRS while the second memristor 30 (corresponding to the memristor on the right) is in the low state LRS. The first memristor 28 in the high state HRS then pushes the voltage of the source line $SL_i$ towards the complementary bit line $BLb_j$ connected to the second memristor 30 in the low state LRS, as represented by the arrow F1. The voltage of the source line $SL_j$ is then closer to the low potential $V_L$ for the complementary bit line $BLb_j$ than to the high potential $V_H$ of the bit line $BL_i$ and is hence lower than the middle voltage [V(BL)+V(BLb)]/2, so that the result of the XNOR operation is equal to 1. The above indeed satisfies XNOR(0,0)=1.

In the second situation where the binary input received on the input line $IN_i$ is equal to 1 and the binary value $w_{ji}$ stored in the memory cell 12 is equal to 1, the first pair of memristors 28, 30 is activated, and the first memristor 28 (corresponding to the memristor on the left) is in the high state HRS, the second memristor 30 (corresponding to the memristor on the right) being in the low state LRS. The first memristor 28 in the high state HRS then pushes the voltage of the source line $SL_i$ towards the complementary bit line $BLb_j$ connected to the second memristor 30 in the low state LRS, as represented by the arrow F1. The voltage of the source line $SL_i$ is then lower than the middle voltage [V(BL)+V(BLb)]/2, and the result of the operation XNOR is therefore equal to 1. The above indeed satisfies XNOR(1, 1)=1.

In the third situation where the binary input received on the input line $IN_i$ is equal to 1 and the binary value $w_{ji}$ stored in the memory cell 12 is equal to 0, the first pair of memristors 28, 30 is activated, and the first memristor 28 (corresponding to the memristor on the left) is in the low state LRS, while the second memristor 30 (corresponding to the memristor on the right) is in the high state HRS. The second memristor 30 in the high state HRS then pushes the voltage of the source line $SL_j$ towards the bit line $BL_j$ connected to the first memristor 28 in the low state LRS, as represented by the arrow F2. The voltage of the source line $SL_j$ is then closer to the high potential $V_H$ of the bit line $BL_j$ than to the low potential $V_L$ for the complementary bit line $BL_j$ and is hence higher than the middle voltage [V(BL)+V(BLb)]/2, so that the result of the XNOR operation is 0. The above indeed satisfies XNOR(1,0)=0.

In the fourth and last situation where the binary input received on the input line $IN_i$ is equal to 0 and the binary value $w_{ji}$ stored in the memory cell 12 is equal to 1, the second pair of memristors 28, 30 is activated, and the first memristor 28 (corresponding to the memristor on the left) is in the low state LRS, while the second memristor 30 (corresponding to the memristor on the right) is in the high state HRS. The second memristor 30 in the high state HRS then pushes the voltage of the source line $SL_j$ towards the bit line $BL_j$ connected to the first memristor 28 in the low state LRS, as represented by the arrow F2. The voltage of the source line $SL_j$ is then greater than the middle voltage [V(BL)+V(BLb)]/2, and the result of the operation XNOR is therefore equal to 0. The above indeed satisfies XNOR(0, 1)=0.

A person skilled in the art would of course understand that, with an inverted coding logic as well, where the binary value 1 stored in the memory cell 12 is coded in the form of the first memristor 28 in the low state LRS and of the second memristor 30 in the high state HRS, and in a corollary manner, the binary value 0 is coded in the form of the first memristor 28 in the high state HRS and of the second memristor 30 in the low state LRS, each memory cell 12 of the examples shown in FIGS. 2, 4 and 7 can be still used for performing the operation XNOR, and that the result of the operation XNOR is then equal to 0 if the voltage of the source line SL is lower than the middle voltage [V(BL)+V(BLb)]/2, and conversely equal to 1 if the voltage of the source line SL is higher than the middle voltage [V(BL)+V(BLb)]/2, all still under the assumption where the high potential $V_H$ is applied to the bit line BL, while the low potential $V_L$ is applied to the complementary bit line BLb.

Of course, assuming that the potentials are applied to the complementary bit lines BL, BLb in an inverted manner with respect to the foregoing, with the high potential $V_H$ applied to the complementary bit line BLb and the low potential $V_L$ applied to the bit line BL, then the logic of comparing the voltage of the source line SL with the middle voltage to determine the result of the XNOR operation would also be inversed.

Figure 5:
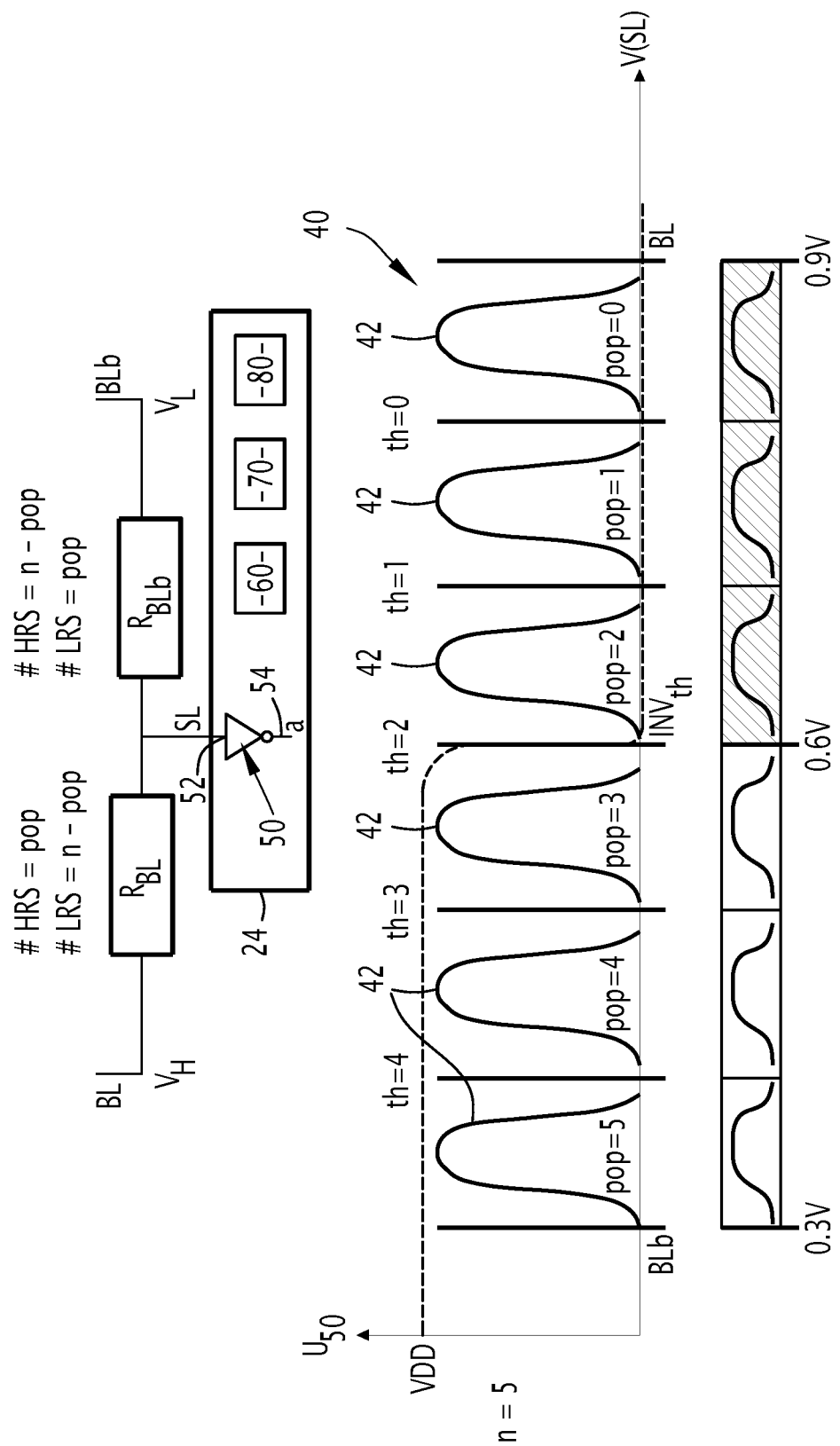
FIG. 5 is a schematic representation of a respective logic unit of FIG. 1, and of the output voltage of said logic unit taking into account the variability effect represented in FIG. 3, for an example with five rows of memory cells.

FIG. 5 then concerns the voltage distributions obtained overall on the source line $SL_j$, i.e. at the bottom of the source line $SL_j$ in the examples shown in FIGS. 1 and 7, when a plurality of input lines $IN_i$ are used simultaneously, the graph of the voltage distributions shown in FIG. 5 illustrating the case where five input lines $IN_i$ are used simultaneously.

The example shown in FIG. 5 relates in particular the case of the inference of a binary neural network. To understand what follows, it can be observed that a binary neural network has a specificity in inference compared to a conventional neural network.

When a conventional neural network is applied to an input vector for computing an output vector, each neuron receives input values corresponding to output values of neurons in a preceding layer $a_j$ and performs a weighted sum $\Sigma_j W_{ij} \cdot a_j$, and the neuron then applies a non-linear function $f$ to the result of the weighted sum.

In contrast, in a binary neural network, the weighted sum is obtained by performing the following operation:

$$a_j = \text{sign}[\text{popcount}_i(\text{XNOR}(w_{ji}, x_i)) - T_j] \qquad [1]$$

where $a_j$ is the output value computed by the neuron,
$x_i$ represent the input values for said neuron,
$w_{ji}$ represent the respective bit weights associated with said neuron for each of the inputs;
XNOR is the logic operation of exclusive NOR;
$\text{popcount}_i$ is the function which counts the number of 1s in a series of bits, when i varies between 1 and the number n of inputs;
$T_j$ is a predefined threshold, and
sign is a function which associates the value 1 with a positive input and associates—1 with a negative value.

When the input values are applied to the n input lines $IN_i$, where n represents the number of input lines $IN_i$, n word lines are activated among the 2n complementary word lines $WL_i$, $WLb_i$. This then forms a divider bridge between the bit line $BL_i$ and the complementary bit line $BL_i$, as shown in the upper part of FIG. 5, where a first equivalent resistance $R_{BL}$ corresponds to the equivalent resistance for the divider bridge portion connected between the bit line $BL_j$ and the source line $SL_j$, and a second equivalent resistance $R_{BLb}$ corresponds to the equivalent resistance for the divider bridge portion connected between the complementary bit line $BLb_j$ and the source line $SL_j$.

According to the foregoing, in particular in light of the example shown in FIG. 4, if the result of the XNOR operation is equal to 1, then the first memristor 28 to the left of the source line $SL_j$ is in the high state HRS and the second memristor 30 to the right of the source line $SL_j$ is in the low state LRS. On the other hand, if the result of the XNOR operation is equal to 0, then the first memristor 28 to the left of the source line $SL_j$ is in the low state LRS and the second memristor 30 to the right of the source line $SL_j$ is in the high state HRS.

For the first equivalent resistance $R_{BL}$ corresponding to the divider bridge portion to the left of the source line $SL_j$, the number of memristors in the high state HRS, denoted #HRS in FIG. 5, is then equal to pop, where pop is equal to the result of the popcount function in the previous equation (1) when the input values $x_i$ are the input values applied to the n input lines $IN_i$, and for the first equivalent resistance $R_{BL}$, the number of memristors in the low state LRS, denoted #LRS in FIG. 5, is then equal to n-pop, n representing the number of input lines $IN_i$.

In the example shown in FIG. 5, the first equivalent resistance $R_{BL}$ then satisfies the following equation:

$$\frac{1}{R_{BL}} = \frac{pop}{HRS} + \frac{n - pop}{LRS} = \frac{pL + H(n-p)}{HL} = \frac{p(L-H) + nH}{HL} \qquad [2]$$

Where $R_{BL}$ is the first equivalent resistance,
pop, or the abbreviated notation p, is equal to the result of the popcount function of the previous equation (1),
n representing the number of input lines $IN_i$,
HRS, or further the abbreviated notation H, represents the resistance of memristor 28, 30 in the high state HRS, and
LRS, or further the abbreviated notation L, represents the resistance of the memristor 28, 30 in the low state LRS.

As a corollary, for the second equivalent resistor $R_{BLb}$ corresponding to the divider bridge portion to the right of the source line $SL_j$, the number #LRS of memristors in the low state LRS is then equal to pop, the number #HRS of memristors in the high state HRS is then equal to n-pop.

In the example shown in FIG. 5, the second equivalent resistance $R_{BLb}$ then satisfies the following equation:

$$\frac{1}{R_{BLb}} = \frac{pop}{LRS} + \frac{n-pop}{HRS} = \frac{pH + L(n-p)}{HL} = \frac{p(H-L) + nL}{HL} \quad [3]$$

where $R_{BLb}$ is the second equivalent resistance,
pop, or the abbreviated notation p, is equal to the result of the popcount function of the previous equation (1),
n representing the number of input lines $IN_i$,
HRS, or further the abbreviated notation H, represents the resistance of memristor 28, 30 in the high state HRS, and
LRS, or further the abbreviated notation L, represents the resistance of the memristor 28, 30 in the low state LRS.

According to the previous equations (2) and (3), the voltage of the source line SL then satisfies the following equation:

$$V(SL) - V(BLb) = \frac{R_{BLb}}{R_{BL} + R_{BLb}} * \Delta BL \quad [4]$$

$$= \frac{\frac{HL}{p(H-L)+nL}}{\frac{HL}{p(L-H)+nH} \frac{HL}{p(H-L)+nL}} * \Delta BL$$

$$= \frac{1}{\frac{p(H-L)+nL}{p(L-H)+nH} + 1}$$

where V(SL) is the voltage of the source line SL,
V(BLb) represents the voltage of the complementary bit line BLb, and
ΔBL represents the voltage differential between the voltage of the bit line BL and the voltage of the complementary bit line BLb according to the following equation:

$$\Delta BL = |V(BL) - V(BLb)| \quad [5]$$

After simplification, the voltage of the source line SL then satisfies the following equation:

$$V(SL) = \frac{n*HRS + pop*(LRS-HRS)}{n(L+H)} * \Delta BL + V(BLb) \quad [6]$$

where V(SL) is the voltage of the source line SL,
V(BLb) is the voltage of the complementary bit line BLb,
ΔBL represents the voltage differential between the voltage of the bit line BL and the voltage of the complementary bit line BLb according to the equation (5),
pop is equal to the result of the popcount function of the previous equation (1),
n representing the number of input lines $IN_i$,
HRS, or further the abbreviated notation H, represents the resistance of memristor 28, 30 in the high state HRS, and
LRS, or further the abbreviated notation L, represents the resistance of the memristor 28, 30 in the low state LRS.

A person skilled in the art would observe that the preceding equation (6) depends on the value pop, i.e. on the result of the popcount function of the preceding equation (1). The larger the pop value, the larger the term |pop*(LRS−HRS)|, and since the term pop*(LRS−HRS) is negative because HRS>LRS, the weaker the term n*HRS+pop*(LRS−HRS). Consequently, the greater the value pop, the lower the voltage of the source line SL, and close to the voltage of the complementary bit line BLb.

Because of the variability of the memristors in operation, as described hereinabove with reference to FIG. 3, a distribution 40 of the voltages of the source line SL according to the preceding equation (6) includes a plurality of lobes 42, each lobe 42 representing a probability density of the voltage of the source line SL for a given value pop. The number of lobes 42 contained in the distribution 40 is then equal to the number of possible values of the value pop, i.e. to n+1, with n representing the number of input lines $IN_i$.

The number of threshold values needed for determining the value of the voltage of the source line SL among the n+1 lobes 42 is then equal to n, such values of a threshold th being correspondingly denoted by th=0 to th=n−1 in the example shown in FIG. 5, with n=5.

The reading module 24 will now be described in greater detail with reference to FIGS. 5 to 9.

The reading module 24 includes a logic unit 50 for each column 18, each logic unit 50 comprising at least one input terminal 52 connected to a respective source line SL, so as to receive an input value called the column value, and an output terminal 54. The logic unit 50 is suitable for performing a logic operation with a switch between a low value and a high value, according to a comparison between the column value and a toggle threshold value $INV_{th}$, during the computation operation, the result, denoted by a, of the logic operation being delivered at the output terminal 54.

According to the invention, the reading module 24 further includes a modification unit 60 suitable for modifying, for at least one logic unit 50 and depending on the desired computation operation, a difference between the column value and the toggle threshold value $INV_{th}$. In other words, the modification unit is suitable for modifying, for at least one logic unit 50 and depending on desired computation operation, the toggle threshold value $INV_{th}$ with respect to the column value.

The logic operation performed by the logic unit 50 is preferentially an inversion, the logic unit 50 typically being a single inverter. The logic unit 50 is then suitable for receiving an incident signal at the input terminal 52 thereof and for performing a logic inversion computation in order to issue at the output terminal 54 thereof, an output signal which is the inverse of the incident signal.

If appropriate, the logic unit 50 can include "inputs" other than the input terminal 52 connected to the source line SL, but such possible other inputs should have a neutral value during the computation operation, the possible other inputs then being neutralized. Henceforth, the value at the output of the logic unit 50 depends exclusively on the value present on the source line SL during the computation operation, i.e. on the value received at the input terminal 52. In addition to the computation operations, any other inputs of logic unit 50 can take non-neutral values.

As an example of the preceding paragraph, the logic unit 50 is an XOR gate with an input set to 0. XOR is the English name of the logic operation "exclusive or". According to another example, the logic unit 50 is a NAND gate with an input set to 1. NAND is the English name of the operand "not AND". According to yet another example, the logic unit 50 is a NOR gate with an input set to 0. Nor is the English name of the operand "not OR".

A person skilled in the art would then understand that the logic unit 50 does not necessarily carry out an inversion operation as a whole, but can include two inverters in series, so as to form a non-inverting logic gate. Given the above, the logic unit 50 comprises the equivalent of at least one inverter and that the toggle threshold value with which the voltage of the source line SL is compared corresponds to the toggle threshold value $INV_{th}$ of the inverter or of the inverter equivalent to a more complex logic gate the other inputs of which are neutralized.

A person skilled in the art would then observe that if the reading module 24 includes only the modification unit 60 in the form of a single inverter, then the reading module 24 can compare the voltage of the source line SL with only one toggle threshold value $INV_{th}$, as shown as an example of the prior art in the lower part of FIG. 5. In said example, the single toggle threshold value $INV_{th}$, also called inversion threshold, or switchover threshold, is chosen equal to 0.6 V, i.e. the middle between the voltage of the complementary bit line BLb chosen equal to 0.3 V and the voltage of the bit line BL chosen equal to 0.9 V. In said example, if the pop value, i.e. the result of the popcount function, is greater than a middle threshold, i.e. equal to 3, 4 or 5, then the voltage of the source line SL is less than 0.6V, and the logic unit 50 will give the value 1 at the output terminal 54 thereof, the voltage $U_{50}$ at the output terminal 54 shown in dotted lines then being at VDD. If the value pop is less than the middle threshold, i.e. equal to 0, 1 or 2, then the voltage of the source line SL is higher than 0.6 V, and the logic unit 50 will give the value 0 at the output terminal 54 thereof, the voltage $U_{50}$ at the output terminal 54 then being at 0.

Thereby, with a single inverter, it is possible to compare the pop value with a threshold, such as the middle threshold. However, the above is insufficient for performing a neuronal operation, where the threshold value is set fixed to the average value. For this reason, the prior art generally uses a full comparator at the bottom of the column, for comparing the pop value to any threshold defined during training. And yet, the use of a comparator at the bottom of the column requires a large surface area (much larger than a single inverter), a non-negligible consumption and a small parallelism due to multiplexing at the bottom of the column.

According to the invention, the modification unit 60 is then used for modifying, for at least one logic unit 50 and depending on the desired computation operation, the difference between the column value and the toggle threshold value $INV_{th}$, i.e. to change the toggle threshold value $INV_{th}$ with respect to the column value.

Figure 8:
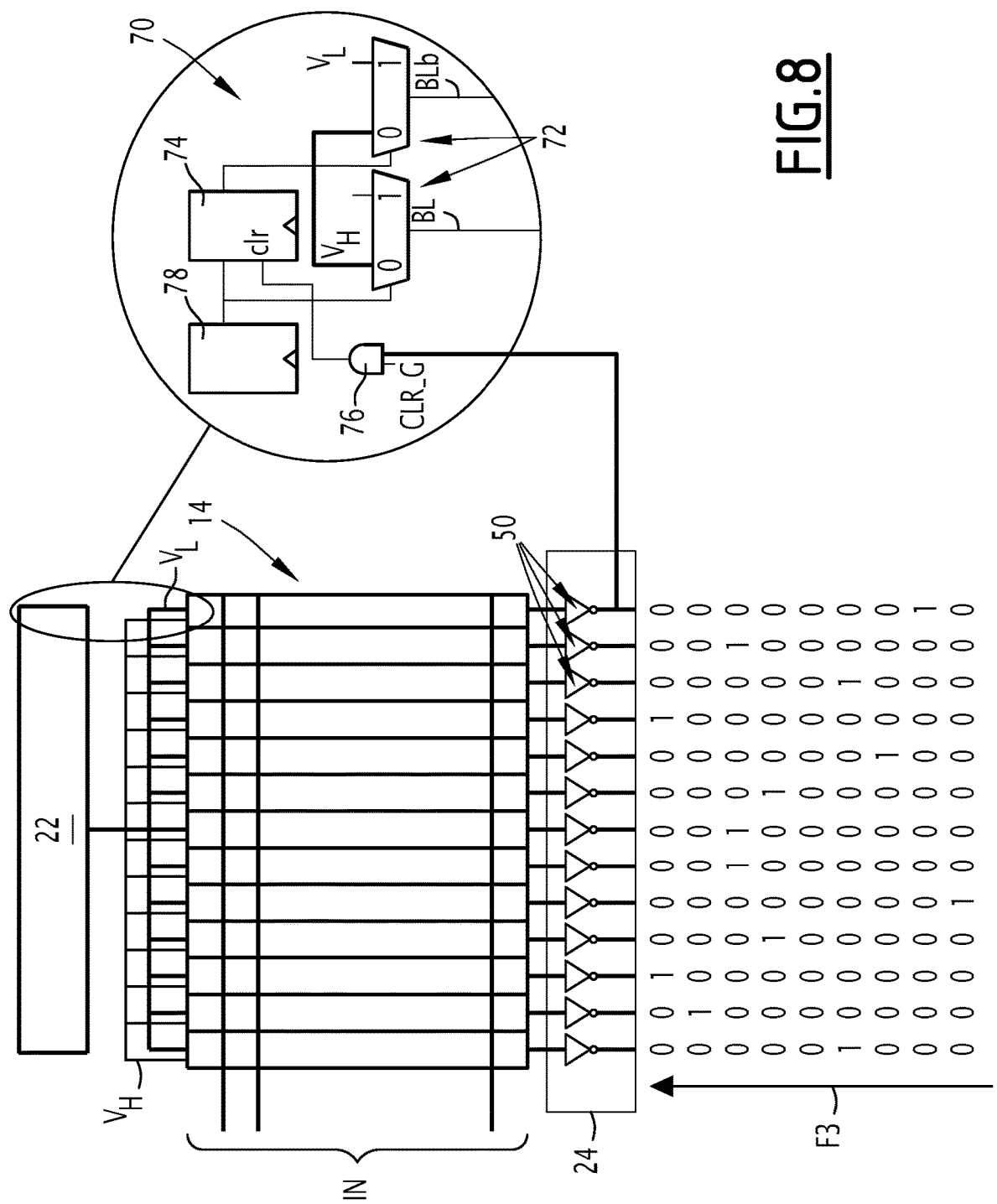
FIG. 8 is a schematic representation of the electronic circuit according to the invention with a particular implementation of a controller of the pairs of complementary bit lines, suitable for resetting a respective column value after detection, by the logic unit, of a toggle for said column.
Figure 9:
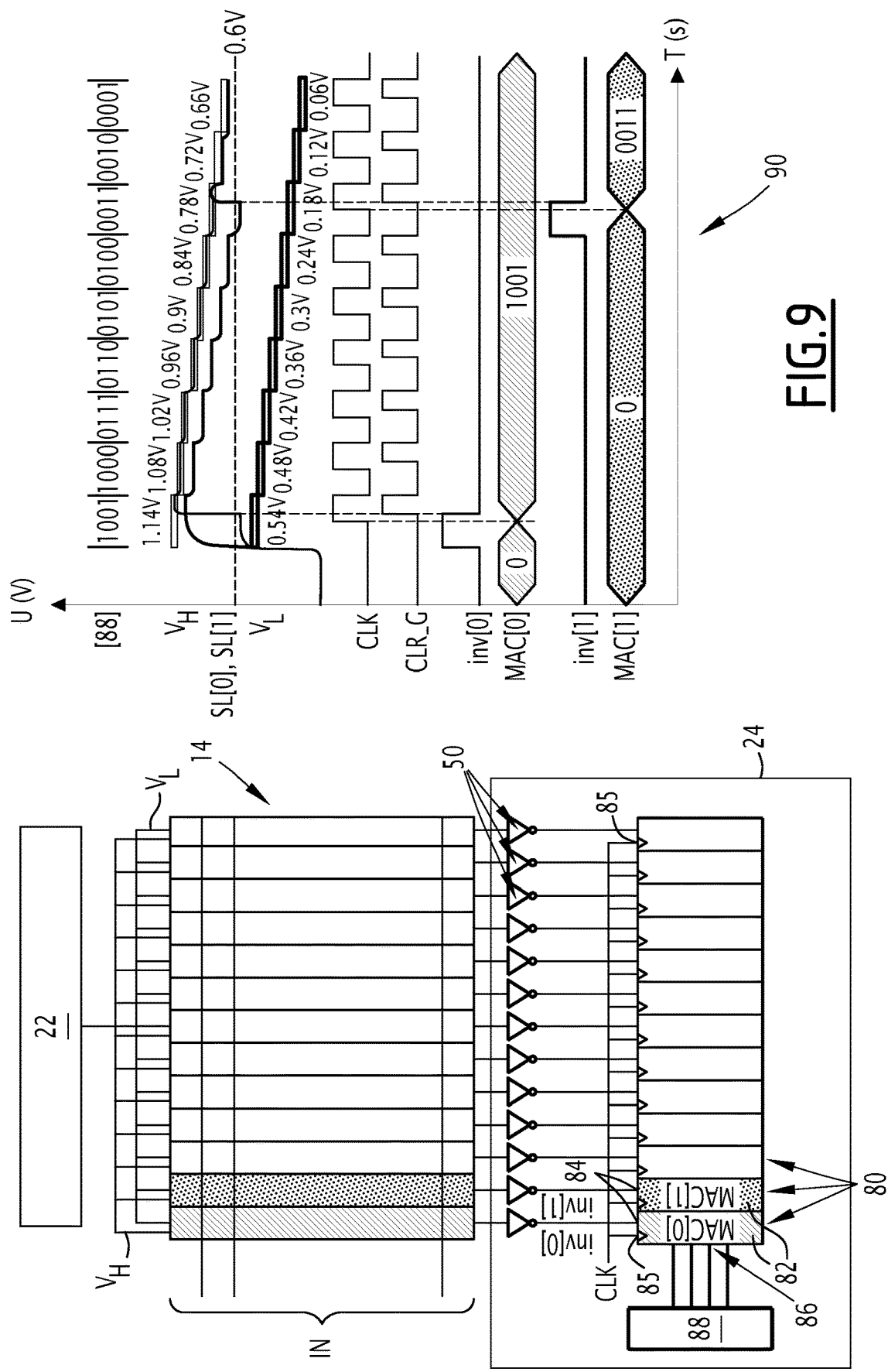
FIG. 9 is a schematic representation of the electronic circuit according to the invention and of an associated timing diagram, the circuit further including a register at the output of each logic unit, each register being suitable for transcribing in binary form, the result of the computation operation for the column, by recording—until the resulting value corresponding to the result of the computation operation is reached—each successive value at the output of the corresponding logic unit, as illustrated in the timing diagram.

The modification unit 60 can then be used in particular for comparing the value pop, i.e. the result of the function popcount, with any threshold value, by having at the bottom of the column, only the logic unit 50, typically in the form of a single inverter, as illustrated in FIGS. 7 to 9.

The modification unit 60 is e.g. suitable for modifying the difference between the column value and the toggle value $INV_{th}$ for a respective logic unit 50, by commanding a modification of the complementary voltages applied to the pair of complementary bit lines BL, BLb for the column 18 associated with said logic unit 50.

Figure 6:
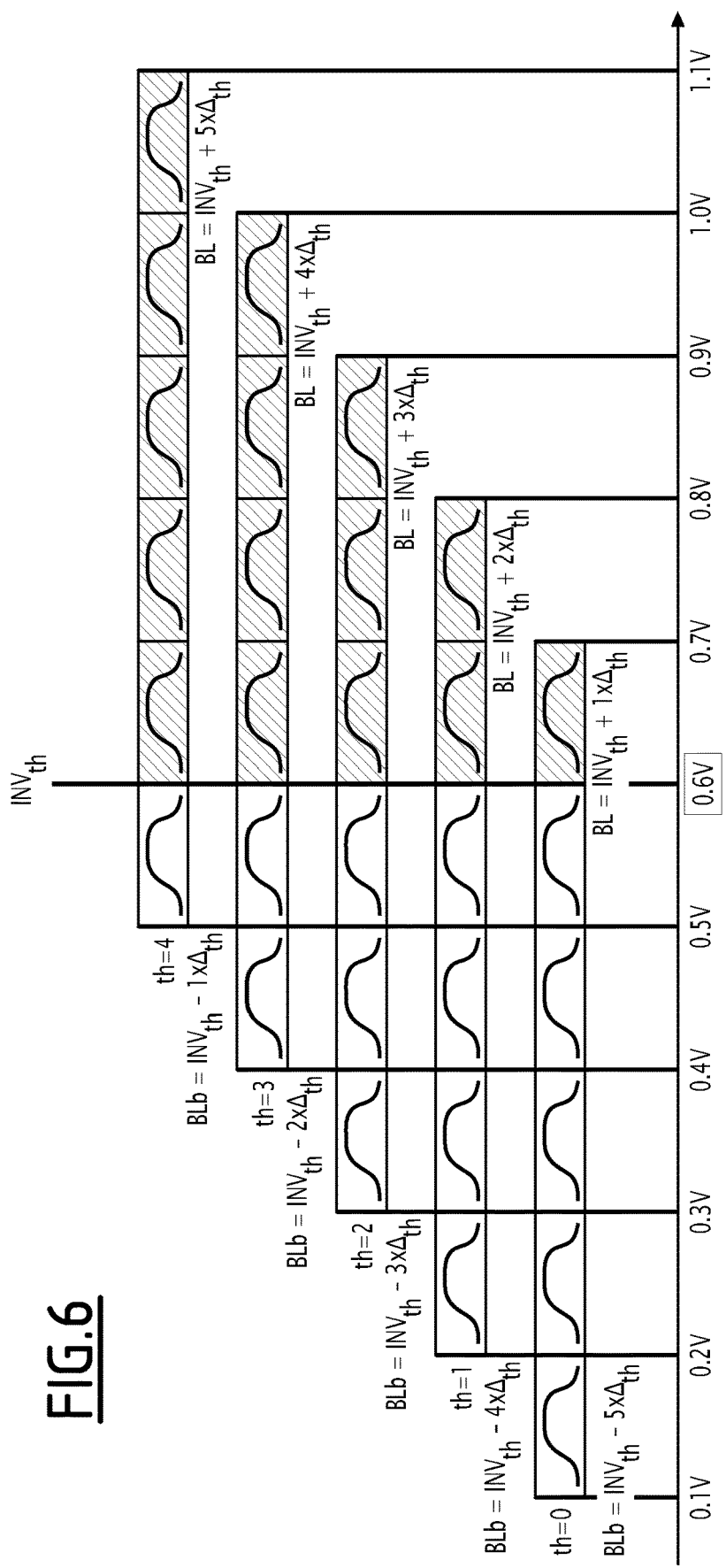
FIG. 6 is a schematic representation illustrating the modification, for the logic unit of FIG. 5, of the difference between the column value and the toggle threshold value.

In the example shown in FIG. 6, to obtain the first threshold th=0 shown in FIG. 5, the voltage of the complementary bit line BLb is commanded to the value $INV_{th}$−5*Δth, i.e. e.g. 0.1 V, and the voltage of the bit line BL is commanded to the value $INV_{th}$+Δth, i.e. e.g. 0.7 V, while the toggle threshold value $INV_{th}$ is unchanged, remaining equal to 0.6 V in said example. To obtain the second threshold th=1 shown in FIG. 5, the voltage of the complementary bit line BLb is commanded to the value $INV_{th}$−4*Δth, i.e. e.g. 0.2 V, and the voltage of the bit line BL is commanded to the value $INV_{th}$+2*Δth, e.g. 0.8 V, while the toggle threshold value $INV_{th}$ is unchanged, e.g. at 0.6 V. To obtain the third threshold th=2 shown in FIG. 5, the voltage of the complementary bit line BLb is commanded to the value $INV_{th}$−3*Δth, i.e. e.g. 0.3 V, and the voltage of the bit line BL is commanded to the value $INV_{th}$+3*Δth, e.g. 0.9 V, while the toggle threshold value INV th is unchanged, e.g. at 0.6 V. To obtain the fourth threshold th=3 shown in FIG. 5, the voltage of the complementary bit line BLb is commanded to the value $INV_{th}$−2*Δth, i.e. e.g. 0.4 V, and the voltage of the bit line BL is commanded to the value $INV_{th}$+4*Δth, i.e. e.g. 1 V, while the toggle threshold value $INV_{th}$ is unchanged, e.g. at 0.6 V. Finally, to obtain the fifth threshold th=4 of FIG. 5, the voltage of the complementary bit line BLb is commanded to the value $INV_{th}$−Δth, i.e. e.g. 0.5 V, and the voltage of the bit line BL is commanded to the value $INV_{th}$+5*Δth, e.g. 1.1 V, while the toggle threshold value $INV_{th}$ is unchanged, e.g. at 0.6 V.

A person skilled in the art would observe that in the example shown in FIG. 6, the modification of the complementary voltages of the pair of complementary bit lines BL, BLb takes place with a variation according to a variation step Δth from one threshold to the next.

The variation step Δth satisfies e.g. the following equation:

$$\Delta th = \left( \frac{(p+1)L + H(n-p-1)}{n(L+H)} - \frac{pL + H(n-p)}{n(L+H)} \right) * \Delta BL = \frac{H-L}{n(L+H)} * \Delta BL \quad [7]$$

where ΔBL represents the voltage differential between the voltage of the bit line BL and the voltage of the complementary bit line BLb according to the equation (5),
pop, or the abbreviated notation p, is equal to the result of the popcount function of the previous equation (1),
n representing the number of input lines $IN_i$,
HRS, or further the abbreviated notation H, represents the resistance of memristor 28, 30 in the high state HRS, et
LRS, or further the abbreviated notation L, represents the resistance of the memristor 28, 30 in the low state LRS.

In a variant (not shown), the modification unit 60 is suitable for modifying the difference between the column value and the toggle threshold value $INV_{th}$ for a respective logic unit 50, by commanding a modification of the toggle threshold value $INV_{th}$ of said logic unit 5.

According to such variant, the toggle threshold value $INV_{th}$ is e.g. modified via a change in the supply voltage of said logic unit 50, or via a change in the bias voltage of a rear gate of at least one transistor of said logic unit 50, or via both the change of the supply voltage and the change of the bias voltage.

As an optional addition, the modification unit 60 is suitable for modifying, incrementally according to a predefined incrementation step, said difference between the column value and the toggle threshold value $INV_{th}$, in order to determine, from among a plurality of predefined possible values, a resulting value corresponding to the voltage of the respective source line SL, i.e. corresponding to said column value. The incrementation step depends on said plurality of possible values. According to said optional addition, the incrementation step is e.g. equal to the variation step Δth defined hereinabove.

When the computation operation performed is a neural computation operation, such as the MAC operation, the electronic circuit 10 according to the invention with the set of memory cells 12 organized according to the matrix 14 including n rows 16 and m columns 18, is then used for implementing a neural network 65 with n inputs and m outputs, such as a fully connected neural network, as represented in FIG. 7. In the example shown in FIG. 7, the electronic circuit 10 then comprises n*m memory cells 12, each including two pairs of memristors 28, 30 and two pairs of switches 32, 34, i.e. n*m 4T4R cells; as well as n pairs of complementary word lines WL, WLb, i.e. 2*n word lines WL, WLb; m source lines SL; and m pairs of complementary bit lines BL, BLb, i.e. 2*m bit lines BL, BLb.

Because of the high variability of the memristors 28, 30, the electronic circuit 10 is preferentially limited to 9 inputs activated simultaneously, i.e. n equal to 9. In the case where the neural networks used require neurons larger than 9 inputs (which is very common), it is then advantageously recommended to divide the overall neuron into portions of 9 inputs, and to sum the results of the MAC of each portion in order to obtain the overall popcount, which will be compared to the threshold specific to the neuron. Such division of the overall neuron into portions of 9 inputs is known per se, and even has a practical aspect, since the usual convolutions filters have a size of 3 by 3, i.e. 9 inputs in total.

As a result, the generation of the voltages of the pairs of complementary bit lines BL, BLb is advantageously shared for all the columns 18 of the matrix 14, thereby reducing the complexity of the generation of the shifts of the voltages of the pairs of complementary bit lines BL, BLb, as described hereinabove, so as to successively modify the toggle threshold value $INV_{th}$ with respect to the column value. All the thresholds th=0 to th=n−1 are then preferentially tested successively in ascending order, or alternatively in descending order, resulting at the output of each logic unit 50 in a sequence of bits which corresponds to the value of the partial MAC with 9 inputs. Moreover, such sequence of bits can be interpreted by a thermometric coding, close to one-hot coding. The series of bits contains a series of 1s which corresponds to the thresholds which are lower than the value pop (result of the popcount function).

As an optional addition, the reading module 24 further includes an extinction unit 70 for each column 18, each extinction unit 70 being suitable—after determining the resulting value for the respective column 18 and pending determination of all the resulting values for a respective group of columns 18—for commanding the application of the same voltage to the pair of complementary bit lines BL, BLb for the circulation of a substantially zero current in the source line SL of the respective column 18.

Each extinction unit 70 makes it possible then to limit the current consumption at the output of the corresponding source line SL, by "turning off" the corresponding column as soon as the first "1" thereof is obtained at the output of the logic unit 50. In addition, a complete one-hot coding is then obtained, as shown in FIG. 8, without the unnecessary sequence of 1s.

The second controller 20 suitable for commanding the pairs of complementary bit lines BL, BLb generally contains two two-input multiplexers 72, one for each bit line BL, BLb, each multiplexer 72 being useful for conventional writing and reading operations. The multiplexers 72 are controlled by control bits stored in registers. Each extinction unit 70 is then obtained e.g. by connecting the output of each logic unit 50 to the reinitialization signal clr (clear or reset), of a flip-flop 74 for commanding the respective complementary bit line BLb thereof, done via an AND logic gate 76, which is also linked to a global clearing signal CLR_G, as represented in the example shown in FIG. 8. In the example shown in FIG. 8, the other flip-flop 78 is a command flip-flop of the respective bit line BL.

In the example shown in FIG. 8, at the end of each shift of the voltages of the pairs of complementary bit lines BL, BLb, if the output of the logic unit 50 is a "1", said output will clear the control flip-flop 74 of the respective complementary bit line BLb at the next cycle, thereby setting the two voltages of the pairs of complementary bit lines BL, BLb to the voltage of the bit line BL, i.e. at the high voltage $V_H$, and thereby resulting in a zero current within the column 18 concerned, then in a "0" at the output of the corresponding logic unit 50. In said example, one should just start with the highest threshold, then going down towards the lowest threshold. In FIG. 8, the direction of the time evolution for the succession of bits at the output of each logic unit 50 is represented by the arrow F3.

As an optional addition, the successive outputs of the logic units 50 are stored in registers specific to each column 18.

As a further optional addition, the reading module 24 further includes a storage unit 80 for each column 18, each storage unit 80 being suitable for storing the resulting value determined for the respective column 18, pending determination of all resulting values for a respective group of a plurality of columns 18.

Each storage unit 80 preferentially includes a bit register 82 for storing said determined resulting value in binary form. Each storage unit 80 is advantageously in the form of the bit register 82.

According to such optional addition, in the example shown in FIG. 9, each output of the logic unit 50 is connected to a respective bit register 82, each output driving the "enable" signal 84 of the associated register 82. The register 82 typically contains 4 bits, since 4 bits are sufficient to code a MAC operation the value of which varies between 0 and 9. The registers 82 further have a clock input 85 receiving a clock signal CLK and an input 86 common and parallel to all the registers 82. The common input 86 is driven by a counter (or down-counter) 88. The counter (or down-counter) 88 is advantageously the same as same used in the control of the pairs of complementary bit lines BL, BLb.

FIG. 9 illustrates the overall operation of such storage units 80, with a timing diagram showing two cases, a column with a MAC equal to 9, in dark gray, and a column with a MAC equal to 3, in light gray.

After selecting the input lines IN corresponding to the inputs of the neurons, the voltages of the pairs of complementary bit lines BL, BLb corresponding to the first desired threshold (e.g. herein the highest threshold) are first applied to the pairs of complementary bit lines BL, BLb. The output, denoted by inv[0], of the logic unit 50 of the hatched column sets to 1, because the MAC operation thereof, denoted by MAC[0], is maximum and is equal to 9. As a result, when the clock CLK of the registers 82 switches to 1, the register 82 of the hatched column captures the binary code of the counter 88, which corresponds to the value 9. Subsequently, at the edge of the global clearing signal CLR_G, the command flip-flop 74 of the complementary bit line BLb of the hatched column is cleared, equalizing—e.g. at the high potential $V_H$—, the voltages of the pairs of complementary bit lines BL, BLb of the column 18, to "turn off" same in the rest of the computations with the remaining thresholds, setting to 0, the output of the logic unit 50, denoted by inv[0]. As for the column filled with points, the output, denoted by inv[1], of the logic unit 50 thereof remains at 0 until the cycle of the threshold "3", where same switches to 1 because of the MAC operation thereof, denoted by MAC [1], is equal to 3, and then follows the same sequence as the hatched column.

Simulations of the 9-input neuron show excellent results. Indeed, when the variability of the transistors forming the switches 32, 34 is not simulated, the error rate at the output of the logic unit 50 is zero for all cases, i.e. whatever the pop value resulting from the popcount function and whatever the threshold value. When said variability of the transistors is simulated, the error rate at the output of the logic unit 50 is similar to the error rate of a conventional approach, while observing that the electrical consumption with the electronic circuit 10 according to the invention is then markedly lower, typically more than 80 times lower, than the consumption of the prior art circuit, at a better or an equivalent latency.

A person skilled in the art would then observe that the electronic circuit 10 according to the invention can then be used for efficiently performing the neural computation operation, such as the MAC operation according to the preceding equation (1), and by requiring a small surface area for the components implementing said operation, while also having a low consumption, and by providing an increased possibility of parallelism, as shown in particular in FIG. 7.

In the example shown in FIG. 10, each memory cell 12 includes only one pair of memristors 28, 30, i.e. only a first memristor 28 and only one second memristor 30, and only one pair of switches 32, 34, i.e. only one first switch 32 and only one second switch 34.

According to the example shown in FIG. 10, each memory cell 12 is also suitable for storing at least one binary value, such as a binary weight, in particular a respective binary synaptic weight of the neural network when the computation operation performed is a neural computation operation.

The coding of each memory cell 12 is e.g. that described in the article "*Efficient and Robust Nonvolatile Computing-In-Memory Based on Voltage Division in 2T2R RRAM With Input-Dependent Sensing Control*" by L. Wang et al. (2021). Each column 18 also has a pair of complementary bit lines BL, BLb and a source line SL. Each row 16 then includes a single word line WL. The first and second memristors 28, 30 are used for coding each differential weight (HRS-LRS or LRS-HRS), in a way similar to what was described hereinabove. A voltage is then applied between the complementary bit lines BL, BLb of the column 18, thereby producing a resistive bridge between the memristors on the left and right sides of the column 18. The resulting voltage corresponds to the result of the MAC operation, performed this time with an AND operation, rather than the XNOR operation described hereinabove.

To prevent sometimes having an even number of activated memory cells 12, a parity word line WL_p is added, and the parity word line WL_p is configured for activating 2T2R (coded in HRS, LRS) memory cells 12, which would become activated if the number of IN inputs is even. As a result, the voltage distributions will always be on both sides of the threshold of the logic unit. The parity word line WL_p is advantageous especially when the computation operation is the Majority logic operation.

Once such symmetry problem has been solved, the number of threshold shifts via the variations of the voltages of the pairs of complementary bit lines BL, BLb, is suited to the number of activated word lines WL. The maximum value of the counter (or down-counter) 88 is then equal to the number of activated word lines WL plus one. The voltages of the pairs of complementary bit lines BL, BLb which are symmetrical with respect to the threshold of the inverter, correspond to the middle threshold, an upward shift corresponding to a lower threshold, and a downward shift corresponding to a higher threshold. In the case where the number of word lines WL is even, a person skilled in the art would understand that it is not necessary to consider the lowest threshold, which simply corresponds to the memory cell 12 associated with the parity word line WL_p.

The advantage of the example shown in FIG. 10 is that by activating only the necessary word lines WL, the current in the columns 18 is greatly reduced. Furthermore, the memory cell 12 used is a 2T2R cell, rather than a 4T4R memory cell as in the examples shown in FIGS. 2, 4 and 7. Moreover, the example shown in FIG. 10 also makes it possible to reduce the number of threshold shifts via the variations of the voltages of the pairs of complementary bit lines BL, BLb, the number adapting depending on the number of activated word lines WL.

In a variant, no parity word line is added, and the electronic circuit 10 then further comprises a control unit configured for adapting, in an analog way, the voltages of the pairs of complementary bit lines BL, BLb in the case where the number of activated word lines WL is odd.

Figure 11:
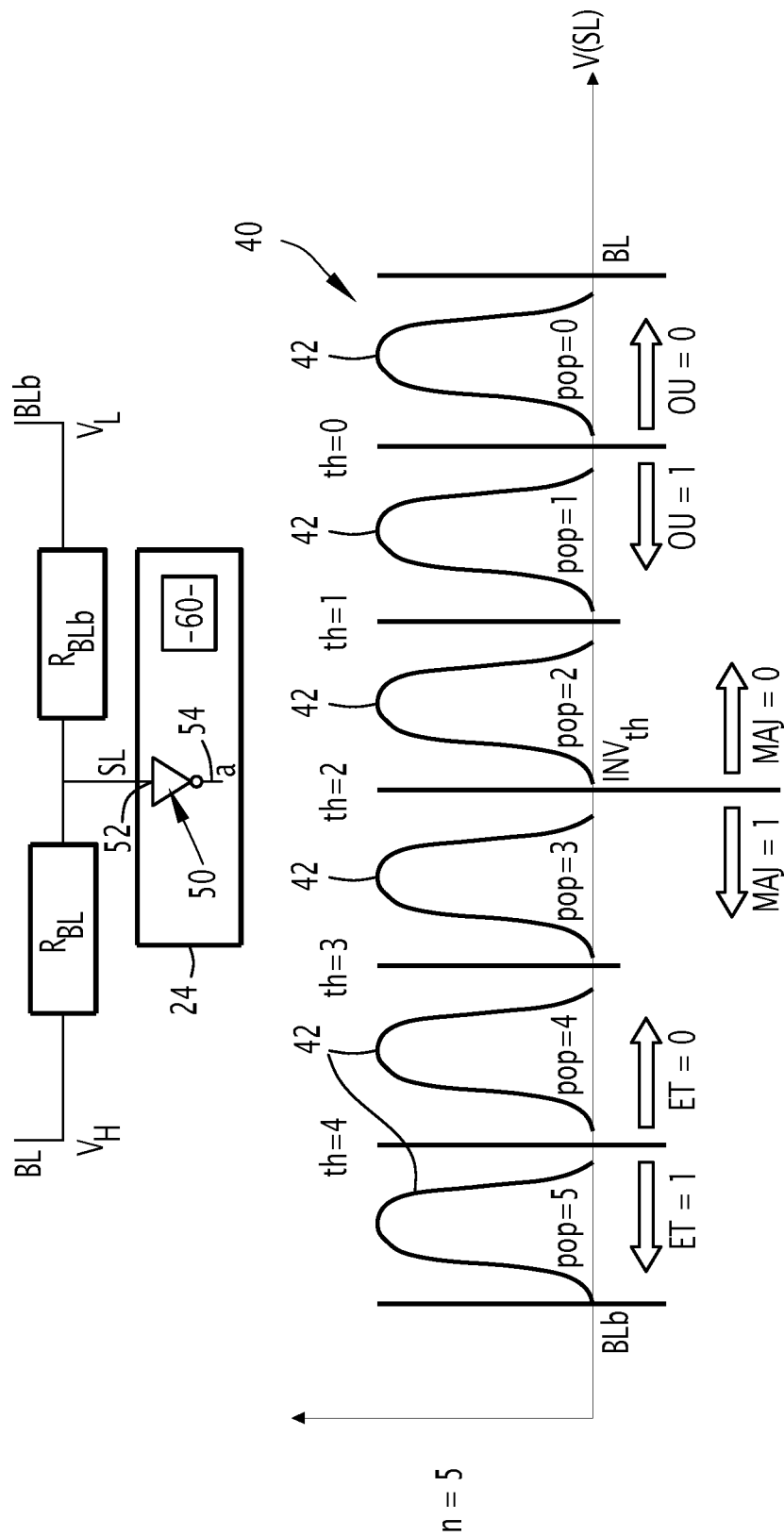
FIG. 11 is a view similar to the view shown in FIG. 5, further representing examples of toggle threshold, when the computation operation performed is the logic AND operation, or the logic OR operation, respectively.

In the example shown in FIG. 11, the computation operation performed by the electronic circuit 10 is an AND operation on binary operands, or an OR operation on binary operands, or even a Majority operation among binary operands.

In the example shown in FIG. 11, the distribution 40 of the voltages of the source line SL is similar to the distribution shown in FIG. 5, as described hereinabove, and includes the plurality of lobes 42, each lobe 42 representing a probability density of the voltage of the source line SL for a given value pop. The number of lobes 42 contained in the distribution 40 is then equal to the number of possible values of the voltage of the source line S(VL), i.e. to n+1, with n representing the number of input lines $IN_i$.

The number of threshold values needed for determining the value of the voltage of the source line SL among the n+1 lobes 42 is then equal to n, the values of a threshold th being correspondingly denoted by th=0 to th=n−1 in the example shown in FIG. 11, with n=5.

However, when the computation operation performed is the AND operation on binary operands, or the OR operation on binary operands, or the Majority operation among binary operands, a person skilled in the art would observe that a single threshold is needed each time.

Indeed, the AND operation on the plurality of binary operands is equal to 1 if and only if all the binary operands are equal to 1, and equal to 0 in all the other cases. The threshold is then positioned so as to be able to detect the voltage probability density lobe corresponding to the case where all the operands are equal to 1, and determining then whether or not all the operands are equal to 1, then deducing the result of the AND operation.

On the other hand, the OR operation on the plurality of binary operands is equal to 0 if and only if all binary operands are equal to 0, and equal to 1 in all the other cases. The threshold is then positioned so as to be able to detect the voltage probability density lobe corresponding to the case where all the operands are equal to 0, and determining then whether or not all the operands are equal to 0, then deducing the result of the OR operation.

In the above coding logic example where the binary value is coded equal to 1, with for the first pair of memristors 28, 30 (or the only pair in the example shown FIG. 10), the left memristor, i.e. the first memristor 28, is coded in high resistance (high state HRS), and the memristor on the right, i.e. the second memristor 30, is coded in low resistance (low state LRS), the only threshold used then being the lowest threshold for implementing the AND operation, and the highest threshold to implement the OR operation, respectively, and again the middle threshold for the Majority operation, respectively, as shown in FIG. 11.

The computation operation can then be used for performing a logic AND, or a logic OR, or a logic Majority for each column 18 separately for all the rows 16 of the matrix 14, —this only for the rows the word lines WL of which are activated. The electronic circuit 10 according to said example of the invention can then be used for activating a plurality of rows 16 in parallel, in order to perform the Boolean computation—namely logic AND, or logic OR, or even a logic Majority—bit by bit on a plurality of inputs in parallel.

In general, the value of the toggle threshold INV t h depends on the associated computation operation.

In the example shown in FIG. 11, when the associated computation operation is the AND operation or the OR operation, the value of the toggle threshold $INV_{th}$ is typically at a voltage step of a corresponding voltage of a bit line BL, BLb, the corresponding voltage of the bit line BL, BLb being one of the voltages of the complementary bit lines BL, BLb for the AND operation and the other of said voltages for the OR operation.

The voltage step typically satisfies the following equation:

$$P = \frac{\Delta BL}{OPD + 1} \qquad [8]$$

where P is the voltage step;

$\Delta BL$ represents the voltage differential between the voltage of the bit line BL and the voltage of the complementary bit line BLb, and OPD represents the number of operands to which the computation operation is applied.

In the example shown in FIG. 11, when the associated computation operation is the Majority operation, the value of the toggle threshold $INV_{th}$ is typically the median value of the voltages of the complementary bit lines BL, BLb. All the cases where the result of the Majority operation is equal to 1 then correspond to lobes 42 of voltage probability density arranged on the same side of the median threshold; and all the cases where the result of the Majority operation is equal to 0 then correspond to lobes 42 of voltage probability density arranged on the other side of said median threshold.

As a further optional addition, the reading module 24 further includes a combination unit 90 for at least one column 18, each combination unit 90 being suitable for combining the results of logic operations performed successively by a respective logic unit 50, for implementing a combined logic operation. The combined logic operation is typically chosen from the group consisting of: an exclusive OR operation and an exclusive NOR operation.

Each combination unit 90 preferentially comprises a flip-flop 92 connected to the output of the respective logic unit 50. Each combination unit 90 is advantageously in the form of the flip-flop 92.

Figure 12:
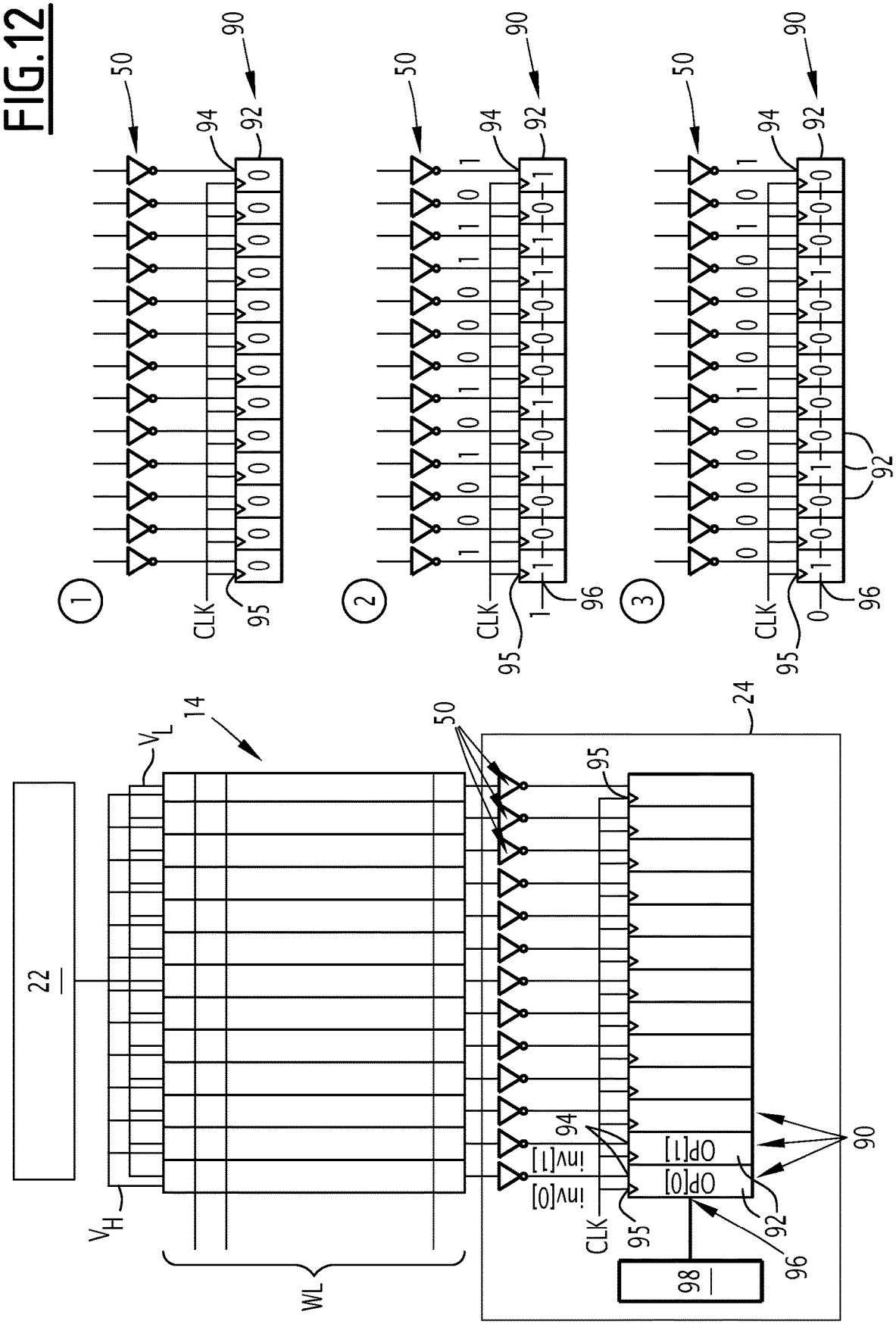
FIG. 12 is a schematic representation of the electronic circuit according to the invention, the circuit further including a flip-flop at the output of each logic unit, each flip-flop being suitable for carrying out a combination of the results of logic operations performed successively by a respective logic unit, for implementing a combined logic operation, such as an exclusive OR, or an exclusive NOR operation.

According to such optional addition, in the example shown in FIG. 12, each output of the logic unit 50, denoted by inv[0] for the first column 18, then by inv[1] for the second column 18, and so on, is connected to a respective flip-flop 92, each output inv[i] driving the "enable" signal 94 of the associated flip-flop 92, with i an integer index comprised between 0 and the number of columns 18 minus one. The flip-flops 92 also have a clock input 95 receiving a clock signal CLK and an input 96 common and parallel to all the flip-flops 82. The common input 96 is driven by a control unit 98. The control unit 98 is advantageously common with same used in the control of the pairs of complementary bit lines BL, BLb. (To be checked by the inventor)

FIG. 12 illustrates the overall operation of such combination units 90, with e.g. a three-step sequence.

During a first initial step, identified by an encircled 1, the content of all the flip-flops 92 is reinitialized to 0 via the application of a clear signal, as is known per se.

In a second step, identified by an encircled 2, the two operands of each column 18 to which the combined logic operation, such as an exclusive OR operation, or XOR, is to be applied, are first selected via the corresponding word lines WL.

In the example shown in FIG. 12, during the second step, an OR operation is then performed with the two operands of each column 18, and via each respective logic unit 50, in the way described hereinabove with reference to FIG. 11. The result of each OR operation is then applied to the Enable input of the corresponding flip-flop 92 and during a next edge of the clock signal CLK, by applying the value 1 to the common input 96 of the flip-flops 92. As a result, the flip-flops 92, the Enable input of which is at "1", take the value "1" and the other flip-flops 92, the Enable input of which is at "0", keep the value "0" corresponding to the previous reinitialization step.

During a third step, identified by an encircled 3, a new logic operation is performed with the two operands of each column 18, and via each respective logic unit 50.

In the example shown in FIG. 12, during the third step, an AND operation is then performed with the two operands of each column 18, and via each respective logic unit 50, in the way described hereinabove with reference to FIG. 11. An AND operation between the result of the previous OR operation and the inverse result of each AND operation (i.e. the result complemented to 1 of each AND operation) is then obtained in the flip-flop 92 corresponding to the next edge of the clock signal CLK, by applying the value 0 to the common input 96 of the flip-flops 92. Indeed, during the next edge of the clock signal CLK, the value 0 on the common input 96 will be forced in the flip-flops 92 for which the "enable" signal 94 is at 1, i.e. the flip-flops for which the result of the AND operation is performed during the third step is equal to 1. In other words, if the NAND operation applied with the two operands of each column 18 is equal to 1, then the "enable" signal 94 is equal to 0, and the result of the operation OR of the second step is then kept in the corresponding flip-flop 92.

In other words, in the example shown in FIG. 12, the combination unit 90 can then be used for performing an exclusive OR operation, denoted by XOR, with the two operands of each column 18, taking into account the following equation:

$$XOR(a,b) = (a \ OR \ b) AND \overline{(a AND b)} = (a+b) \cdot \overline{(a \cdot b)} \qquad [9]$$

where XOR means the exclusive OR operation;
both a and b represent operands;
OR, or "+", refers the logic operation OR;
AND, or "·", refers to the logic operation AND; and
— represents the operator NO.

In the example shown in FIG. 12, the result of the combined logic operation, obtained in each flip-flop 92 at the end of the sequence, is then denoted by OP[i], with i an integer index comprised between 0 and the number of columns 18 minus one, i.e. OP[0] for the first column 18, then OP[1] for the second column 18, and so on.

A person skilled in the art would then understand that the flip-flops 92 can be more generally used for implementing any type of combination of logic operations AND or OR for performing combined logic operations, the logic operations AND or OR being performed via the logic units 50, as described hereinabove with reference to FIG. 11.

A person skilled in the art would also observe that, if only the first two steps identified by the circled 1 and 2 are implemented, the flip-flops 92 then form a means of storing the result of the logic operations performed by the logic units 50.

According to an optional supplementary aspect, the electronic circuit 10 according to the invention further comprises additional switches (not shown), configured for connecting the source lines SL of a group of a plurality of columns 18 to one another, and then performing the logic operations per group of columns 18, rather than by group of rows 16.

According to such supplementary aspect, the logic unit 50 used to perform the logic operation for said group of columns 18 is preferentially the same connected to the source line SL which is apt to be connected to all the other source lines SL of the columns 18 of the group.

According to such supplementary aspect, all the source lines SL are optionally connected to one another via the additional switches, which are then advantageously configured for all being closed during each computation operation. Where appropriate, the second controller 22 inhibits the column or columns 18 not belonging to the group of columns 18 for which the logic operation is to be performed, by applying a high impedance potential to the pairs of complementary bit lines BL, BLb of said column(s) 18 not belonging to the group of columns 18. The command of the additional switches is thereby simplified.

It should be noted that it is possible in practice to combine, at the same time, the two possibilities of "combination of operands" in columns 18 or in rows 16 by selecting operands on a plurality of rows 16 and linking the columns 18 as described hereinabove via a connection between the source rows SL thereof.

In the examples shown in FIGS. 2, 4, 7 and 10, each memristor 28, 30 of a respective memory cell 12 is linked to the same source line SL and to a respective switch 32, 34.

A person skilled in the art would understand that in a variant (not shown), each memory cell 12 of a respective column 18, comprises at least one pair of sub-cells (not shown), each sub-cell including a memristor 28, 30 and a switch 32, 34, each memristor 28, 30 of a respective sub-cell being connected to a respective source line and a respective switch 32, 34. Similarly, the memristors 28, 30 of each pair of sub-cells then store a binary value, respectively, by presenting first and second different resistance values respectively. Similarly, the switches 32, 34 are connected, for the activation thereof, to a respective word line WL and connected to a pair of complementary bit lines BL, BLb, respectively, the two switches 32, 34 of a respective pair of sub-cells being linked to the same word line WL.

According to such variant, the two source lines associated with a respective pair of sub-cells are then connected to each other during each computation operation via an auxiliary switch (not shown), to then form the same source line SL, also called a common source line for the memory cells 12 of the same column 18, to which each memristor 28, 30 of a respective memory cell 12 is linked during each computation operation.

It should thereby be understood that the electronic circuit 10 according to the invention is used for more efficiently determining a resulting value corresponding to the voltage of the respective source line SL, by means of the reading module 24 thereof including a logic unit 50 for each column 18 and the modification unit 60 suitable for modifying, for at least one logic unit 50 and according to the computation operation, the difference between the column value and the toggle threshold value $INV_{th}$ of the corresponding logic unit 50.

The invention claimed is:

1. An electronic circuit suitable for implementing computation operations each providing a binary output, the circuit comprising:
    word lines;
    pairs of complementary bit lines;
    source lines;
    a set of memory cells organized in a matrix including rows and columns, the memory cells of a same row being selectable by at least one word line, the memory cells of a same column being linked to a pair of complementary bit lines and at least one source line;
    each memory cell having at least one pair of memristors and at least one pair of switches, each memristor of a respective memory cell being connected to a respective switch and linked to a same source line during each computation operation, each pair of memristors correspondingly storing a binary value presenting, correspondingly, first and second different resistance values; the switches being linked, for activation, to a respective word line and correspondingly linked to a pair of complementary bit lines, the two switches of a respective pair being linked to a same word line;
    a reading module implemented during each computation operation, the reading module including:
    a logic unit for each column, each logic unit comprising at least one input terminal connected to a respective source line, for receiving an input value called a column value, the logic unit being suitable for performing a logic operation which toggles between a low value and a high value depending on a comparison of the column value with a toggle threshold value, during the computation operation, the logic unit forming a logic inverter during the computation operation, and
    a modification unit suitable for modifying, for at least one logic unit and according to the desired computation operation, a difference between the column value and the toggle threshold value.

2. The electronic circuit according to claim 1, wherein the modification unit is suitable for modifying the difference between the column value and the toggle value for a respective logic unit, by commanding a modification of the complementary voltages applied to the pair of complementary bit lines for the column associated with said logic unit.

3. The electronic circuit according to claim 1, wherein the modification unit is suitable for modifying the difference between the column value and the threshold value for a respective logic unit, by commanding a modification of the threshold value of said logic unit.

4. The electronic circuit according to claim 3, wherein said threshold value is modified by a change in the supply voltage of said logic unit and/or by a change in the bias voltage of a rear gate of at least one transistor of said logic unit.

5. The electronic circuit according to claim 1, wherein the modification unit is suitable for modifying, incrementally according to a predefined incrementation step, said difference between the column value and the toggle threshold value, for determining—among a plurality of predefined possible values—a resulting value corresponding to the voltage of the respective source line corresponding to said column value; the incrementation step depending on said plurality of possible values.

6. The electronic circuit according to claim 5, wherein the reading module further includes a storage unit for at least one column, each storage unit being suitable for storing the resulting value determined for the respective column, pending the determination of all the resulting values for a respective group of a plurality of columns.

7. The electronic circuit according to claim 6, wherein each storage unit preferentially including a bit register for storing said determined resulting value in binary form.

8. The electronic circuit according to claim 5, wherein the reading module further includes an extinction unit for each column, each extinction unit being suitable—after determining the resulting value for the respective column and pending determination of all the resulting values for a respective group—for commanding the application of a same voltage to the pair of complementary bit lines for the circulation of a substantially zero current in the source line of the respective column.

9. The electronic circuit according to claim 1, wherein each memory cell includes two pairs of memristors and two pairs of switches.

10. The electronic circuit according to claim 9, wherein a first pair of switches is linked to a first word line assigned to an input, and a second pair of switches, respectively, is linked to a second word line assigned to the inverse of said input; and wherein a first pair of memristors is associated with the first pair of switches and storing a binary value, and a second pair of memristors, respectively, being associated with the second pair of switches and storing the inverse of a same binary value.

11. The electronic circuit according to claim 1, wherein each memory cell includes only one pair of memristors and only one pair of switches, each pair of memristors correspondingly storing a synaptic weight.

12. The electronic circuit according to claim 1, wherein the logic operation performed by the logic unit is an inversion, and the associated computation operation is chosen from: a neural computation operation; an AND operation; an OR operation; a Majority operation.

13. The electronic circuit according to claim 1, wherein the value of the toggle threshold depends on the associated computation operation.

14. The electronic circuit according to claim 13, wherein when the associated computation operation is the AND operation or the OR operation, the value of the toggle threshold is at a voltage step from a voltage of a corresponding bit line, the corresponding voltage of the bit line being one of the voltages of the complementary bit lines for the AND operation and the other of the voltages complementary bit lines for the OR operation, the voltage step satisfying the following equation:

$$P = \frac{\Delta BL}{OPD + 1}$$

where P represents the voltage step;
$\Delta BL$ represents the voltage differential between the voltage of the bit line and the voltage of the complementary bit line, and
OPD represents the number of operands to which the computation operation is applied.

15. The electronic circuit according to claim 13, wherein when the associated computation operation is the Majority operation, the value of the toggle threshold is a median value of the voltages of the complementary bit lines.

16. The electronic circuit according to claim 1, wherein the reading module further comprises a combination unit for at least one column, each combination unit being suitable for combining the results of logic operations performed successively by a respective logic unit, for implementing a combined logic operation.

17. The electronic circuit according to claim 16, wherein each combination unit includes a flip-flop connected to the output of the respective logic unit.

18. The electronic circuit according to claim 16, wherein the combined logic operation is chosen from the group consisting of: an exclusive OR operation and an exclusive NOR.

19. The electronic circuit according to claim 1, wherein the logic unit is a logic gate having an output and performing a Boolean function between a plurality of inputs, one input being the input terminal connected to the source line and the other input(s) being positioned in a neutral logic state during the computation operation, so that the logic unit behaves as an inverter between the input terminal connected to the source line and the output.

20. The electronic circuit according to claim 1, wherein each memory cell of a respective column comprises at least one pair of sub-cells, each sub-cell including a memristor and a switch, each memristor of a respective sub-cell being connected to a respective source line and switch, the memristors of each pair of sub-cells correspondingly storing a binary value by correspondingly presenting first and second different resistance values; the switches being linked, for the activation thereof, to a respective word line and correspondingly linked to a pair of complementary bit lines, the two switches of a respective pair of sub-cells being linked to the same word line; the two source lines associated with a respective pair of sub-cells being connected to each other via an auxiliary switch during each computation operation and then forming the same source line to which each memristor of a respective memory cell is linked during each computation operation.

21. The electronic circuit according to claim 1, wherein the electronic circuit is a neuromorphic circuit suitable for implementing a neural network with binary output, each memory cell being associated with a respective synaptic weight of a neuron, and the word lines being apt to receive input voltages during a neural computation.

22. The electronic circuit according to claim 1, comprising a first controller for selecting the memory cells of a row which are linked to the same word line, and comprising a second controller linked to the pairs of bit lines and used for applying different voltages to each pair bit line and symmetrical with respect to a middle voltage, the voltage applied to a bit line being either higher or lower than the voltage applied to the associated complementary bit line.

23. The electronic circuit according to claim 1, wherein the electronic circuit includes a plurality of distinct sets of memory cells suitable for operating in parallel.

* * * * *